(12) United States Patent
Park et al.

(10) Patent No.: US 8,412,387 B2
(45) Date of Patent: Apr. 2, 2013

(54) APPARATUS FOR CONTROLLING A POWER USING A SMART DEVICE AND METHOD THEREOF

(75) Inventors: Jong Soo Park, Gunpo-si (KR); Jong Hwa Song, Suwon-si (KR); Woo Hyun Paik, Seoul (KR)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 12/845,623

(22) Filed: Jul. 28, 2010

(65) Prior Publication Data

US 2011/0196547 A1 Aug. 11, 2011

(30) Foreign Application Priority Data

Feb. 9, 2010 (KR) .................. 10-2010-0012114
Mar. 2, 2010 (KR) .................. 10-2010-0018514

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G06F 1/26* (2006.01)
*G06F 1/32* (2006.01)
*B23K 11/24* (2006.01)
*G05B 24/02* (2006.01)
*H02J 1/00* (2006.01)
*H02J 3/12* (2006.01)
*H01H 45/00* (2006.01)

(52) U.S. Cl. ........ 700/297; 713/310; 713/320; 323/318; 307/118

(58) Field of Classification Search .................. 700/286, 700/295–297; 713/300, 310, 320–324, 330, 713/340; 307/112, 116, 118, 125, 126; 323/318
See application file for complete search history.

(56) References Cited

U.S. PATENT DOCUMENTS

| | | | |
|---|---|---|---|
| 5,900,026 A * | 5/1999 | Ryu .............................. | 713/320 |
| 6,408,395 B1 * | 6/2002 | Sugahara et al. ............. | 713/310 |
| 6,928,564 B2 * | 8/2005 | Tada et al. .................... | 713/321 |
| 7,106,468 B2 * | 9/2006 | Jinbo et al. ................... | 358/1.15 |
| 7,203,848 B2 * | 4/2007 | Mitsubori et al. ............ | 713/300 |
| 7,213,160 B2 * | 5/2007 | Obara et al. .................. | 713/310 |

(Continued)

FOREIGN PATENT DOCUMENTS

| | | | |
|---|---|---|---|
| JP | 10133784 A * | 5/1998 | |
| JP | 2005-107606 A | 4/2005 | |

(Continued)

*Primary Examiner* — Crystal J Barnes-Bullock
(74) *Attorney, Agent, or Firm* — Birch, Stewart, Kolasch & Birch, LLP

(57) ABSTRACT

A smart device is discussed, which is connected to a smart grid to perform a power saving function. According to an embodiment, the smart device includes a power information receiving unit configured to receive power information through the smart grid network; a power saving control unit configured to perform the power saving function for at least one apparatus based on the power information in a power saving mode; at least one mode switching unit configured to switch from the power saving mode to a manual mode according to a user command; and a manual mode operational time determining unit configured to determine a manual mode operational time for operating the at least one apparatus in the manual mode, the at least one mode switching unit further configured to switch from the manual mode back to the power saving mode, automatically, when the manual mode operational time expires.

13 Claims, 49 Drawing Sheets

U.S. PATENT DOCUMENTS

| | | | |
|---|---|---|---|
| 7,219,243 B2 * | 5/2007 | Lim | 713/320 |
| 7,265,852 B2 * | 9/2007 | Goto et al. | 358/1.14 |
| 7,433,620 B2 * | 10/2008 | Sekiguchi et al. | 399/70 |
| 7,461,278 B2 * | 12/2008 | Togawa | 713/320 |
| 7,543,165 B2 * | 6/2009 | Inoue | 713/300 |
| 7,574,615 B2 * | 8/2009 | Weng et al. | 713/320 |
| 7,574,619 B2 * | 8/2009 | Senda | 713/322 |
| 7,679,221 B2 * | 3/2010 | Kim | 307/116 |
| 7,698,581 B2 * | 4/2010 | Oh | 713/300 |
| 8,046,613 B2 * | 10/2011 | Enami et al. | 713/320 |
| 2006/0150020 A1 * | 7/2006 | Lee et al. | 714/36 |
| 2006/0155395 A1 | 7/2006 | Lim | |
| 2009/0259868 A1 * | 10/2009 | Katoh | 713/324 |
| 2011/0006615 A1 * | 1/2011 | Kim et al. | 307/131 |
| 2011/0116427 A1 * | 5/2011 | Chang et al. | 370/311 |

FOREIGN PATENT DOCUMENTS

| | | |
|---|---|---|
| JP | 2006106335 A * | 4/2006 |
| JP | 2007-27866 A | 2/2007 |
| KR | 10-2010-0005406 A | 1/2010 |

* cited by examiner

FIG. 7

| Classification | Destinatian | Contents |
|---|---|---|
| Control | Air conditioner | ON/OFF, temperature setting, airflow, wind direction |
| | Washer | ON/OFF |
| | Refrigerator | cooling/freezing temperature |
| | LED illumination | ON/OFF,Dimming |
| | Smart Plug | standby power cutoff/restore |
| | Smart Meter | remote load cutoff |
| Others | Smart Meter | rate information (TOU),Firmware |

FIG. 8

| Classification | Destination | Contents |
|---|---|---|
| Used amount | air conditioner | real-time sales volume (5 min) |
| Sales volume | Smart Meter | real-time sales volume (5 min) |
| Status | Washer | ON/OFF |
| | Refrigerator | cooling/freezing temperature |
| | LED illumination | ON/OFF,Dimming level |
| | Smart Plug | standby power cutoff/restore |
| | Smart Meter | power information |
| Authentication | All | device authentication |
| Alarm | All | contents, time |

FIG. 9

| ctl. Byte | Data Field(0~128bytes) | | | | CRC | | flag Byte |
|---|---|---|---|---|---|---|---|
| | Data [1] | Data [2] | Data [3] | ... | High Bytes | Low Bytes | |

FIG. 14

| Classification | Destination | Contents |
|---|---|---|
| Control | All | system connection/disconnection |
| | All | Time sync. |
| | Battery | charging/discharging |

FIG. 15

| Classification | Source | Contents |
|---|---|---|
| Generated power amount | Solar power | real-time generated power amount (5min) |
| | small-scale wind power | real-time generated power amount (5min) |
| Charged amount | Battery | real-time charged power amount (KW, %) |
| Status | All | system connection/disconnection |

FIG. 16

| CMD | Start | Addr. | control | Protocol Heater | SMA DATA |||||| FCS | Stop |
|---|---|---|---|---|---|---|---|---|---|---|---|---|
| | | | | | Src. | Dest. | Ctrl | Pktcnt | CMD | Data | | |
| Time Sync | 7E | FF | 3 | 4041 | 0000 | 0000 | 80 | 00 | 0A | 6373 | 8848 | 7E |
| Disconnect | 7E | FF | 3 | 4041 | 0000 | 0100 | 00 | 00 | 0C | 02 | 3673 | 7E |
| Generated power amount | 7E | FF | 3 | 4041 | 0000 | 0100 | 80 | 00 | 0C | 00 | 404A | 7E |

FIG. 18

| Classification | Destination | Contents |
|---|---|---|
| Used amount | EMC | per-household used amount |
| Generated power amount | EMC | per-household generated power amount |
| Screen | SG TV | real-time information, history information |

FIG. 19

| Classification | Source | Contents |
|---|---|---|
| rate information | Emc | rate (Won/kW unit), time |
| electricity charges | Emc | used electricity amount (previous month) |
| control | SG TV | home appliance, new recycling control |
| weather conditions | EMC | weather, outdoor temperature, wind direction, wind speed |
| alarm | SG TV, EMC | alarm, event |
| others | EMC | Firmware:Smart Meter/plug |

FIG. 20

| | 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 1 | Source Port ||||||||||||||| | Destination Port |||||||||||||||
| 2 | Sequence Number |||||||||||||||||||||||||||||||
| 3 | Acknowledgment Number |||||||||||||||||||||||||||||||
| 4 | Header Length |||| Reserved |||| Flag |||||||| Window |||||||||||||||
| 5 | Check sum ||||||||||||||| | Urgent Pointer |||||||||||||||

FIG. 21

|   | 1 | | | | | | | | 2 | | | | | | | |
|---|---|---|---|---|---|---|---|---|---|---|---|---|---|---|---|---|
|   | 1 | 2 | 3 | 4 | 5 | 6 | 7 | 8 | 1 | 2 | 3 | 4 | 5 | 6 | 7 | 8 |
| 1 | Source Port ||||||||  Destination Port ||||||||
| 2 | Sequence Number ||||||||||||||||
| 3 | Acknowledgment Number ||||||||||||||||
| 4 | Header Length |||| Reserved |||| Flag |||| Window Size ||||
| 5 | Window Size |||||||| Check sum ||||||||
| 5 | Check sum |||||||| Urgent Pointer ||||||||

FIG. 22

| Port | Real Port number | Port number of reduced TCP header |
|---|---|---|
| FTP | 21 | 1 |
| FTP(data) | 20 | 2 |
| SMTP | 25 | 3 |
| DNS | 53 | 4 |
| ⋮ | ⋮ | ⋮ |
| HTTP | 8080 | 199 |
| ⋮ | ⋮ | ⋮ |

FIG. 25

| Classification | Contents |
|---|---|
| Used amount | per-household real-time available amount (valid power amount, invalid power amount), |
| | per-household per-metering periodicity used amount |
| Generated power amount | per-household generated power amount (solar energy, small-scale wind power) |
| Power information | distributed power output information (valid voltage, invalid voltage) |

FIG. 26

| Classification | Contents |
|---|---|
| Market information | rate information, power supply/generation plan (real time, ahead of 1 day), used amount (per consortium, per power generating source), transaction amount bill, bid change materials, etc. |
| Metering information | used power amount per household, generated power amount per household, charges per household, statement of accounts (used amount, supplementary service adjusted amount) |
| System information | switch status, generator status, circuit breaker status, Jeju generated/demanded power amount, reserved power, frequency, voltage |

FIG. 31
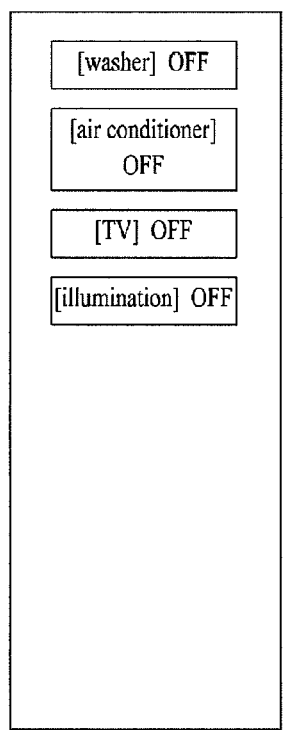
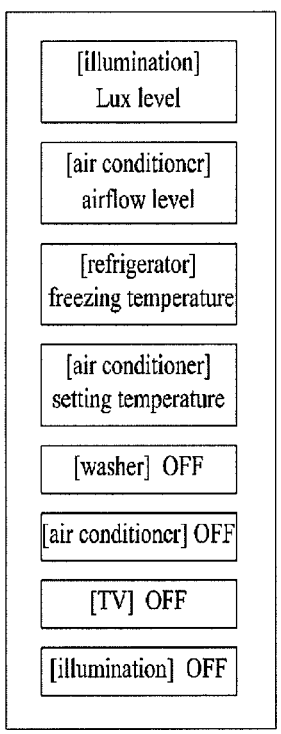
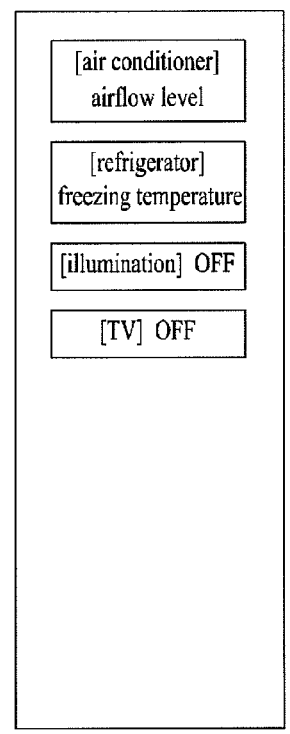
(a) ultra saving mode     (b) sleep mode     (c) user-specific mode

FIG. 32

< Delay Time >

| device \ time | Daytime | Night |
|---|---|---|
| Refrigerator | 1 hour | 30 min |
| Washer | 2h | 1h |
| Air conditioner | 1h | 30 min |
| Illuminator | 5 min | 10 min |

FIG. 33

<Illuminator>

| | Limit range | Minimum |
|---|---|---|
| Study room | 300 ~ 310 lux | ← 300 lux |
| Kitchen | 200 ~ 210 lux | ← 200 lux |
| Living room | 100 ~ 110 lux | ← 100 lux |
| Bathroom | 50 ~ 60 lux | ← 50 lux |

FIG. 34

<Air conditioner>

|  | Limit range | Auto control value |
|---|---|---|
| Summer daytime | 26 ~ 28 ℃ → | 28 ℃ |
| Summer night | All ranges → | + 1 ℃ |

FIG. 35

<Heater>

|  | Limit range | Auto control value |
|---|---|---|
| Winter daytime | All ranges → | − 1 ℃ |
| Winter night | 26 ~ 28 ℃ → | 18 ℃ |

FIG. 37

| Functional Domain | Cluster Name | Security Key |
|---|---|---|
| General | Basic | Network Key |
| General | Identify | Network Key |
| General | Alarms | Network Key |
| General | Time | Application Link Key |
| General | Commissioning | Application Link Key |
| General | Power Configuration | Network Key |
| General | Key Establishment | Network Key |
| Smart Energy | Price | Application Link Key |
| Smart Energy | Demand Response and Load Control | Application Link Key |
| Smart Energy | Simple Metering | Application Link Key |
| Smart Energy | Message | Application Link Key |
| Smart Energy | Smart Energy Tunneling | Application Link Key |
| Smart Energy | Pre - Payment | Application Link Key |
| Smart Energy | Device Status Monitoring | Application Link Key |
| Smart Energy | Group | Application Link Key |

FIG. 39

| Control condition | Korea electric power corp | electricity charges, Used amount | Generated amount |
|---|---|---|---|
| Discharging | over 95 Won/kW | used amount > generated amount | over 60% |
| Discharging | over 95 Won/kW | used amount > generated amount | below 60% |
| Discharging, Sales | over 95 Won/kW | used amount ≤ generated amount | over 60% |
| Discharging | over 95 Won/kW | used amount ≤ generated amount | below 60% |
| Discharging | below 95 Won/kW | used amount > generated amount | over 60% |
| Discharging | below 95 Won/kW | used amount > generated amount | below 60% |
| Discharging, Sales | below 95 Won/kW | used amount ≤ generated amount | over 60% |
| Charging | below 95 Won/kW | used amount ≤ generated amount | below 60% |

APPARATUS FOR CONTROLLING A POWER USING A SMART DEVICE AND METHOD THEREOF

Pursuant to 35 U.S.C. §119(a), this application claims the benefit of earlier filing date and right of priority to Korean Application No. 10-2010-0012114, filed on Feb. 9, 2010 and Korean Application No. 10-2010-0018514 filed on Mar. 2, 2010, the contents of which are hereby incorporated by reference herein in their entirety.

BACKGROUND OF THE INVENTION

1. Field of the Invention

The present invention relates to an automatic power controlling technology, and more particularly, to a smart server and a method of controlling power used by a device using the same.

2. Discussion of the Related Art

Generally, power for operating an electric/electronic appliance such as a home appliance used at home, an office device used at office and the like is supplied in order of a power plant operated by a public facility or a private organization, transmission lines and wiring lines. This is characterized as a central power source instead of a distributed power source, and has a radial structure expanding from a center to a periphery, and is characterized in centering not on a user but on a mono-directional supplier.

However, this technology is based on analog data processing. When a problem occurs, the power has to be manually recovered. And, the power facilities have to be manually recovered as well.

Further, real-time information on the electricity/power charges is not provided. And, sometimes limited information on the electricity charges is provided through a power exchange only. Moreover, the charge system according to the related art is substantially a fixed price system. Therefore, it is unable to offer such an inducement as an incentive to a user through price variation.

SUMMARY OF THE INVENTION

Accordingly, the present invention is directed to a smart server and a method of controlling power used by a device using the same that substantially obviate one or more problems due to limitations and disadvantages of the related art.

An object of the present invention is to provide to a smart server and a method of controlling power used by a device using the same, by which a user's unpleasantness is minimized while power consumption of indoor devices is reduced.

Another object of the present invention is to provide to a smart server and a method of controlling power used by a device using the same, by which green energy can be recycled and by which energy conservation can be obtained.

Another object of the present invention is to provide to a smart server and a method of controlling power used by a device using the same, by which problems and limitations associated with conventional data protocols are addressed.

A further object of the present invention is to provide to a smart server and a method of controlling power used by a device using the same, by providing an interactive power control system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a smart device, which is connected to a smart grid to perform a power saving function, according to an aspect of the present invention includes a charges information receiving unit configured to receive electricity charges information, a power saving control unit performing the power saving function based on the electricity charges information, a manual mode switching unit configured to switch the power saving mode to a manual mode according to a user command, a manual mode operational time determining unit configured to determine a time of operating in the manual mode prior to the charges information, and a power saving mode switching unit switching to the power saving mode automatically if the manual mode operational time expires.

Preferably, the manual mode operational time may be determined based on a relation between a target status corresponding to the user command and a reference status of the smart device.

Preferably, the smart device may further include a detecting unit configured to detect an external environment including at least one selected from the group consisting of an external temperature, an external humidity and a current location, wherein the manual mode operational time is determined based on the external environment.

Preferably, the smart device may further include a memory unit configured to store a use history of the smart device, wherein the manual mode operational time is determined further based on the use history.

Preferably, the smart device may further include a display configured to display the electricity charges information by real time.

In another aspect of the present invention, a smart server, which is connected to at least one smart device via wire/wireless communication network to perform a power saving function, includes a charges information receiving unit configured to receive electricity charges information, a power saving control unit performing the power saving function based on the electricity charges information, a manual mode switching unit configured to switch the power saving mode to a manual mode according to a user command received via the smart device, a manual mode operational time determining unit configured to determine a time for the smart device to operate in the manual mode prior to the charges information, and a power saving mode switching unit switching to the power saving mode automatically if the manual mode operational time expires.

Preferably, the smart server may further include a detecting unit configured to detect an external environment including at least one selected from the group consisting of an external temperature and an external humidity and a memory unit configured to store a use history of the smart device, wherein the manual mode operational time is determined based on a type of the smart device, a relation between a target status corresponding to the user command and a reference status of the smart device, the external environment and the use history.

Preferably, the charges information receiving unit may further include a communication unit configured to receive the electricity charges information from the smart grid via at least one selected from the group consisting of an internet protocol network and a power line communication (PLC), the communication unit configured to receive the user command from the smart device, the communication unit configured to receive the user command from the smart device by at least one selected from the group consisting of the internet protocol network, Zigbee and Bluetooth.

In another aspect of the present invention, a method of controlling a power, which is controlled by a smart device connected to a smart grid according to a power saving mode, includes the steps of receiving electricity charges information, performing a power saving function based on the electricity charges information, switching the power saving mode to a manual mode according to a user command, determining a manual mode operational time corresponding to a time of operating in the manual mode prior to the charges information, and switching to the power saving mode automatically if the manual mode operational time expires.

Preferably, the method may further include the steps of detecting an external environment including at least one selected from the group consisting of an external temperature and an external humidity and storing a use history of the smart device, wherein the manual mode operational time is determined based on a relation between a target status corresponding to the user command and a reference status of the smart device, the external environment and the use history.

Preferably, the method may further include the step of displaying the electricity charges information prior to the switching step.

In another aspect of the present invention, a method of controlling a power, which is controlled by a smart server connected to at least one smart device via wire/wireless communication network according to a power saving mode, includes the steps of receiving electricity charges information, performing a power saving function based on the electricity charges information, switching the power saving mode to a manual mode according to a user command received via the smart device, determining a manual mode operational time corresponding to a time for the smart device to operate in the manual mode prior to the charges information, and switching to the power saving mode automatically if the manual mode operational time expires.

Preferably, the method may further include the steps of detecting an external environment including at least one selected from the group consisting of an external temperature and an external humidity and storing a use history of the smart device, wherein the manual mode operational time is determined based on a type of the smart device, a relation between a target status corresponding to the user command and a reference status of the smart device, the external environment and the use history.

Preferably, the method may further include the step of displaying the electricity charges information prior to the switching step.

In another aspect of the present invention, a method of controlling a smart server according to one embodiment of the present invention includes the steps of receiving electricity charge information, determining a delay time until an auto cont 기 mode entry of the smart server for a specific device according to a presence or non-presence of a user's manual manipulation of the specific device, and controlling a power of the specific device based on the delay time and the electricity charges information.

In another aspect of the present invention, a method of controlling a smart server according to another embodiment of the present invention includes the steps of executing an auto power control over at least one device at home based on a communication protocol, determining whether an even corresponding to an interrupt condition on the execution of the auto power control has occurred, checking that a power of a specific device is turned off if a power-off event of the specific device has occurred as a result of the determining step, and outputting an alarm message about the power-off event of the specific device.

In another aspect of the present invention, a method of controlling a smart server according to another embodiment of the present invention includes the steps of setting a per-function limit value of each device, receiving environment information on a peripheral environment at which the each device is located, and controlling a power for reaching the per-function limit value of the each device to be supplied to the each device using the received environment information on the peripheral environment.

In another aspect of the present invention, a smart server according to one embodiment of the present invention includes a receiving module receiving electricity charge information, a determining module determining a delay time until an auto control mode entry of the smart server for a specific device according to a presence or non-presence of a user's manual manipulation of the specific device, and a control module controlling a power of the specific device based on the delay time and the electricity charges information.

In another aspect of the present invention, a smart server according to another embodiment of the present invention includes an executing module executing an auto power control over at least one device at home based on a communication protocol, a determining module determining whether an even corresponding to an interrupt condition on the execution of the auto power control has occurred, a checking module checking that a power of a specific device is turned off if a power-off event of the specific device has occurred as a result of the determination, and a control unit controlling to output an alarm message about the power-off event of the specific device.

In a further aspect of the present invention, a smart server according to a further embodiment of the present invention includes a setting module setting a per-function limit value of each device, a receiving module receiving environment information on a peripheral environment at which the each device is located, and a control module controlling a power for reaching the per-function limit value of the each device to be supplied to the each device using the received environment information on the peripheral environment.

Accordingly, the embodiments of the present invention provide various advantages such as the following effects and/or advantages.

First of all, according to one embodiment of the present invention, environments in using indoor devices (e.g., home appliances) are optimized, whereby power consumption by these devices can be reduced.

According to another embodiment of the present invention, it is unnecessary for a user to manually control or monitor home appliances one by one, whereby a user's needs can be met.

According to another embodiment of the present invention, a method of recycling green energy and providing energy conservation can be provided.

According to another embodiment of the present invention, problems or limitations of conventional data protocols are addressed and the conventional data protocols can be configured to provide an interactive power control system.

According to another embodiment of the present invention, a power saving function which relies on power/electric rates information (e.g., information on electricity rates, etc.) and a user's command for manual manipulation can be effectively provided.

According to another embodiment of the present invention, if a command for a manual mode is inputted by a user in the course of controlling a power used by a device according to a power saving function, characteristics of the user or device can be reflected on determining a manual mode operative time.

According to a further embodiment of the present invention, by determining a manual mode operative time, a power saving mode is re-entered at the timing point at which a use will release the manual mode or lower the corresponding power consumption in case of paying attention thereto. Therefore, the corresponding electricity charges can be considerably lowered.

According to an aspect, the invention provides a smart device, which is connected to a smart grid network to perform a power saving function, the smart device comprising: a power information receiving unit configured to receive power information through the smart grid network; a power saving control unit configured to perform the power saving function for at least one apparatus based on the power information in a power saving mode, the power saving mode being a mode in which the at least one apparatus is automatically controlled to save power; at least one mode switching unit configured to switch from the power saving mode to a manual mode according to a user command, the manual mode being a mode in which the at least one apparatus is controlled according to a user input; and a manual mode operational time determining unit configured to determine a manual mode operational time for operating the at least one apparatus in the manual mode, the at least one mode switching unit further configured to switch from the manual mode back to the power saving mode, automatically, when the manual mode operational time expires.

According to an aspect, the invention provides a smart server, which is connected to at least one smart device via at least one wired/wireless communication network to perform a power saving function, the smart server comprising: a power saving control unit configured to perform the power saving function on the at least one smart device in a power saving mode, based on power information; at least one mode switching unit configured to switch the power saving mode to a manual power mode according to a user command received via the at least one smart device; and a manual mode operational time determining unit configured to determine a manual mode operational time for operating the at least one smart device in the manual power mode since the mode is switched to the manual power mode, the at least one mode switching unit further configured to switch from the manual power mode back to the power saving mode when the manual mode operational time expires.

According to an aspect, the invention provides a power management adapter for controlling a power use of a target device, the power management adapter comprising: a communication unit configured to communicate with a smart server; a first connecting part configured to couple with a plug of the target device; a second connecting part configured to be coupled to an electric outlet; a switching unit configured to selectively connect the first and second connecting parts to each other under control of the communication unit or a control unit; and the control unit configured to control the switching unit so as to cut off or supply power to the target device based on at least one of information received from the communication unit, time information, and power consumption information.

According to an aspect, the invention provides a method for performing a power saving function using a smart device, which is connected to a smart grid network, the method comprising: receiving, by the smart device, power information through the smart grid network; performing, by the smart device, the power saving function for at least one apparatus based on the power information in a power saving mode, the power saving mode being a mode in which the at least one apparatus is automatically controlled to save power; switching, by the smart device, from the power saving mode to a manual mode according to a user command, the manual mode being a mode in which the at least one apparatus is controlled according to a user input; determining, by the smart device, a manual mode operational time for operating the at least one apparatus in the manual mode; and switching, by the smart device, from the manual mode back to the power saving mode, automatically, when the manual mode operational time expires.

According to an aspect, the invention provides a method for performing a power saving function using a smart server, which is connected to at least one smart device via at least one wired/wireless communication network, the method comprising: performing, under control of the smart server and based on power information, the power saving function on the at least one smart device in a power saving mode; switching, by the smart server, the power saving mode to a manual power mode according to a user command received via the at least one smart device; determining, by the smart server, a manual mode operational time for operating the at least one smart device in the manual power mode since the mode is switched to the manual power mode; and switching, by the smart server, from the manual power mode back to the power saving mode when the manual mode operational time expires.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram illustrating an example of output data output from the smart server shown in FIG. 6 according to an embodiment of the present invention;

FIG. 8 is a diagram illustrating an example of input data received by the smart server shown in FIG. 6;

FIG. 9 is a diagram of a detailed type of the data shown in FIG. 7 or FIG. 8;

FIG. 14 is a diagram illustrating an example of output data output from the smart server shown in FIG. 13;

FIG. 15 is a diagram illustrating an example of input data received by the smart server shown in FIG. 13;

FIG. 16 is a diagram of a detailed type of the data shown in FIG. 14 or FIG. 15;

FIG. 18 is a diagram illustrating an example of output data output from the smart server shown in FIG. 17;

FIG. 19 is a diagram illustrating an example of input data received by the smart server shown in FIG. 17;

FIG. 20 is a diagram of an example of a TCP header according to one embodiment of the present invention;

FIG. 21 is a diagram of an example of a TCP header according to another embodiment of the present invention;

FIG. 22 is a table of an example of TCP header information mapping between a reduced TCP header according to another embodiment of the present invention and a TCP header according to one embodiment of the present invention;

FIG. 25 is a diagram illustrating an example of data transmitted to the TOC (total operating center) by the EMC shown in FIG. 24;

FIG. 26 is a diagram illustrating an example of data transmitted from the TOC (total operating center) to the EMC shown in FIG. 24;

FIG. 31 is a diagram of power control modes according to a first embodiment of the present invention;

FIG. 32 is a table of delay time according to a first embodiment of the present invention;

FIG. 33 is a first table of a limit range according to a first embodiment of the present invention;

FIG. 34 is a second table of a limit range according to a first embodiment of the present invention;

FIG. 35 is a third table of a limit range according to a first embodiment of the present invention;

FIG. 37 is a table of an added Zigbee communication protocol according to a second embodiment of the present invention;

FIG. 39 is a diagram illustrating an example of a table used for operating a smart server according to a third embodiment of the present invention;

DETAILED DESCRIPTION OF THE PREFERRED EMBODIMENTS

Figure 1:
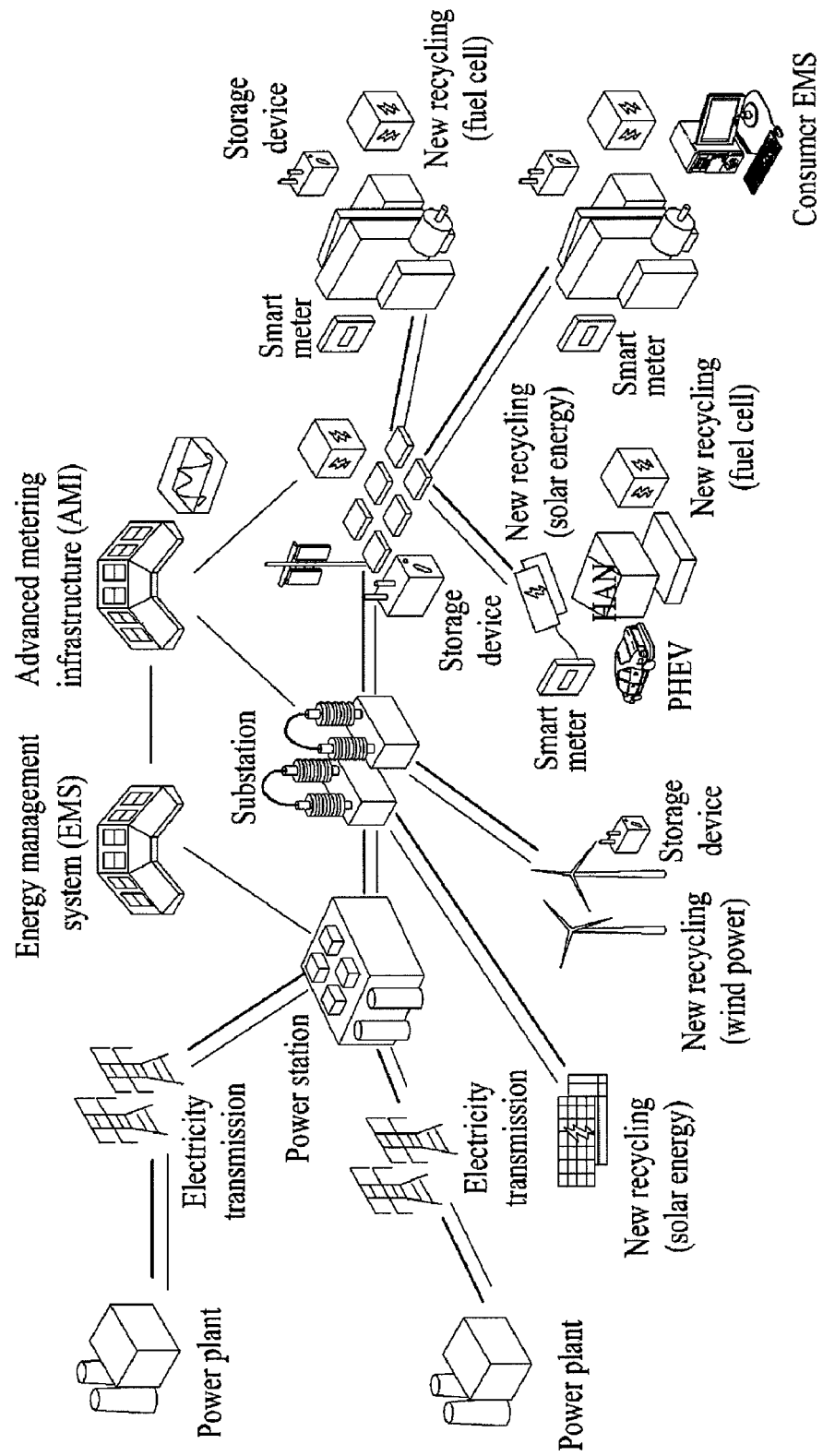
FIG. 1 is a schematic diagram of a smart grid according to an embodiment of the present invention.

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiments disclosed in this disclosure and configurations shown in the accompanying drawings are just preferred embodiments and do not represent all technical ideas of the present invention. Therefore, it is understood that terminologies not disclosed in this specification can be construed as the following meanings and concepts matching the technical ideas of the present invention. In the present invention, the term 'power' covers any type of power (e.g., thermal power, nuclear power, waterpower, solar power, wind power, etc.) and includes electricity, gas, etc. Further, a 'user' can be an end user, consumer, administrator, maintenance person, etc.

Recently, many efforts are ongoing to research and develop a smart grid (i.e., an intelligent power grid) to enhance efficiency of energy. The smart grid means the next generation power system and its management system, which are implemented through convergence and combination of the modernized power technology and the information communication technology.

As mentioned in the foregoing description, a smart grid according to the present invention includes a horizontal, cooperative and decentralized network, which is less concentrated on a supplier and configured to enable interactions between users and a supplier. In contrast, a related art power grid includes a vertical and centralized network, which is concentrated on a center and configured to be controlled by a producer.

As all electric or electrical/electronic devices, power storage devices and distributed powers are connected to a network, the smart grid enables interactions between the users and supplier(s). Therefore, the smart grid is generally called an 'energy internet'.

Meanwhile, in order for the smart grid to be implemented in viewpoint of a power user or consumer, a network, to which an individual home appliance and a plurality of home appliances are connected, needs to be capable of interactive communications with a power supply source for power information instead of receiving power unilaterally. And, the demand for new devices for the interactive communications rising.

Moreover, the demand for a home or business power supply network system and operating method thereof, which can save electric charges (electricity/power charges) by determining a real-time power charge when using an electric appliance, recognizing a peak time of electric charges and then enabling a user to avoid using the electric appliance during the corresponding time, is rising. The embodiments of the invention provide such technologies to address such demands and needs.

FIG. 1 is a schematic diagram of a smart grid. All components of the smart grid are operatively coupled and configured.

Referring to FIG. 1, a smart grid includes a power plant generating power by thermal power generation, waterpower generation or nuclear power generation, a photovoltaic power plant generating power using solar energy as new recyclable energy, and a wind power plant generating power using a wind power as new recyclable energy, for example.

Each of the thermal power plant, the nuclear power plant and the waterpower plant sends power to a power station via a transmission line. The power station sends electricity to a substation to enable the electricity to be distributed to such a user as a home, an office (e.g., business), and the like.

And, the electricity generated from the new recyclable energy is also transmitted to the substation to be distributed to each user. In particular, the electricity transmitted by the substation is distributed to each office or home via a power storage device.

A home, which uses a home area network (HAN), self-produces and self-supplies electricity through solar energy or a fuel cell provided to a PHEV (plug-in hybrid electric vehicle) and is also able to sell an unused portion of the electricity.

A smart metering device is provided to a home or office to acquire real-time power and charge of the used electricity. Through this acquisition, a user recognizes a power level and charges of the currently used electricity and is able to plan a method of reducing a power consumption and electricity charges according to a situation.

Meanwhile, since interactive communications are available for the power plant, station, storage and user, it is able to avoid supplying the electricity to the user laterally. Instead, the electricity production and distribution can be performed to be suitable for a user's situation where the user's situation or status is notified to the storage device, station and power plant.

In the smart grid (e.g., smart grid network), an energy management system (EMS) responsible for real-time power management of a user and real-time estimation of useful power and an advanced metering infrastructure (AMI) configured to meter a quantity of real-time power consumption play various roles.

The AMI of the smart grid can be considered a base technology for combining consumers based on an open architecture for example. The AMI enables a consumer to use the electricity efficiently and provides a power supplier with capability of detecting problems on the system and then managing the system efficiently.

In this case, the open architecture preferably means (but not limited thereto) a reference that enables all electric devices to be connected to each other irrespective of their manufacturers in the smart grid system.

Therefore, the metering device (AMI) used by the smart grid enables consumer-friendly efficiency such as 'prices to devices'.

In particular, a real-time rate signal of a power market is broadcast through the energy management system (EMS) provided to each home. The EMS controls it by communicating with each electric device. Thus, a user recognizes the power information of the corresponding electric device via the EMS and then performs the power information processing such as power consumption level setting, electricity charge limit setting and the like based on the recognized power information. Therefore, the user is able to save energy and cost.

In this case, the energy management system (EMS) can include a local EMS used at office or home and/or a central EMS interactively communicating with the local EMS to process the information collected by the local EMS.

As the real-time communications of the power information between the supplier and the user are enabled in the smart grid, it is able to realize 'real-time power grid reaction'. Therefore, it is able to reduce the cost consumed during the peak demand.

Figure 2:
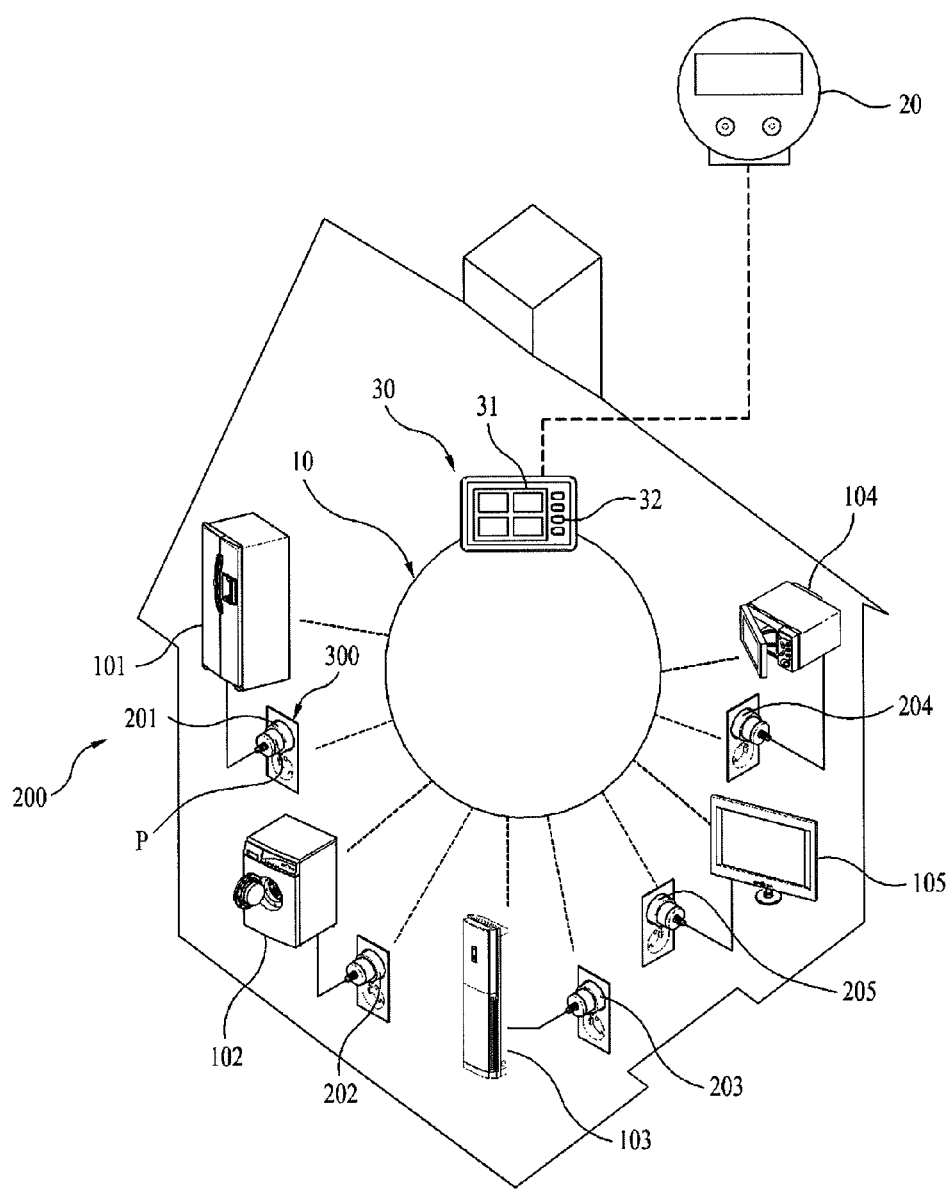
FIG. 2 is a diagram of a home power supply network system 10 as one component of a smart grid.

FIG. 2 is a diagram of a home power supply network system 10 as one component of a smart grid.

Referring to FIG. 2, the power supply network system 10 includes a metering device (smart meter) 20 configured to measure power and charge of electricity supplied to each home and a power consumption peak time interval by real time, and an energy management system 30 connected to the metering device (smart meter) 20 and a plurality of electric devices such as home appliances to control operations of the electric devices. All components of the power supply network system 10 are operatively coupled and configured.

For reference, the power consumption peak time interval or an electricity rate maximum interval preferably means an interval in which the electricity charges or rate becomes most expensive die to a peak time of the power consumption per day.

In this case, the energy management system (EMS) 30 is provided with a screen having an image 31 configured to display a current power consumption state and external environments (e.g., temperature, humidity, etc.) and can be prepared as a terminal including user-operable input buttons 32 and the like.

The energy management system (EMS) 30 is connected to one or more electric appliances such as a refrigerator 101, a washer and dryer 102, an air conditioner 103, a TV set 105, a cooking device 104, etc. via a network or other means within a home to perform interactive communication with the corresponding electric appliance.

The communication within the home can be performed by wireless or wired (e.g., PLC) technologies.

Preferably, each of the electric appliances is arranged to enable communication with one or more other electric appliances by being connected thereto, e.g., wirelessly, wires, etc.

Meanwhile, an electrical outlet 300 for a power supply is provided within the home. In general, a plug P connected to a tip of each electric appliance is inserted into the outlet 300 to supply power to the corresponding electric appliance.

Yet, according to one embodiment of the present invention, a power management adapter 200 is connected to the plug P to effectively perform an operation of selectively supplying and cutting-off of power to and from the corresponding electric appliance while a standby power is cut off from the deactivated electric appliance. And, the power management adapter 200 is electrically connected to the outlet 300.

Figure 3:
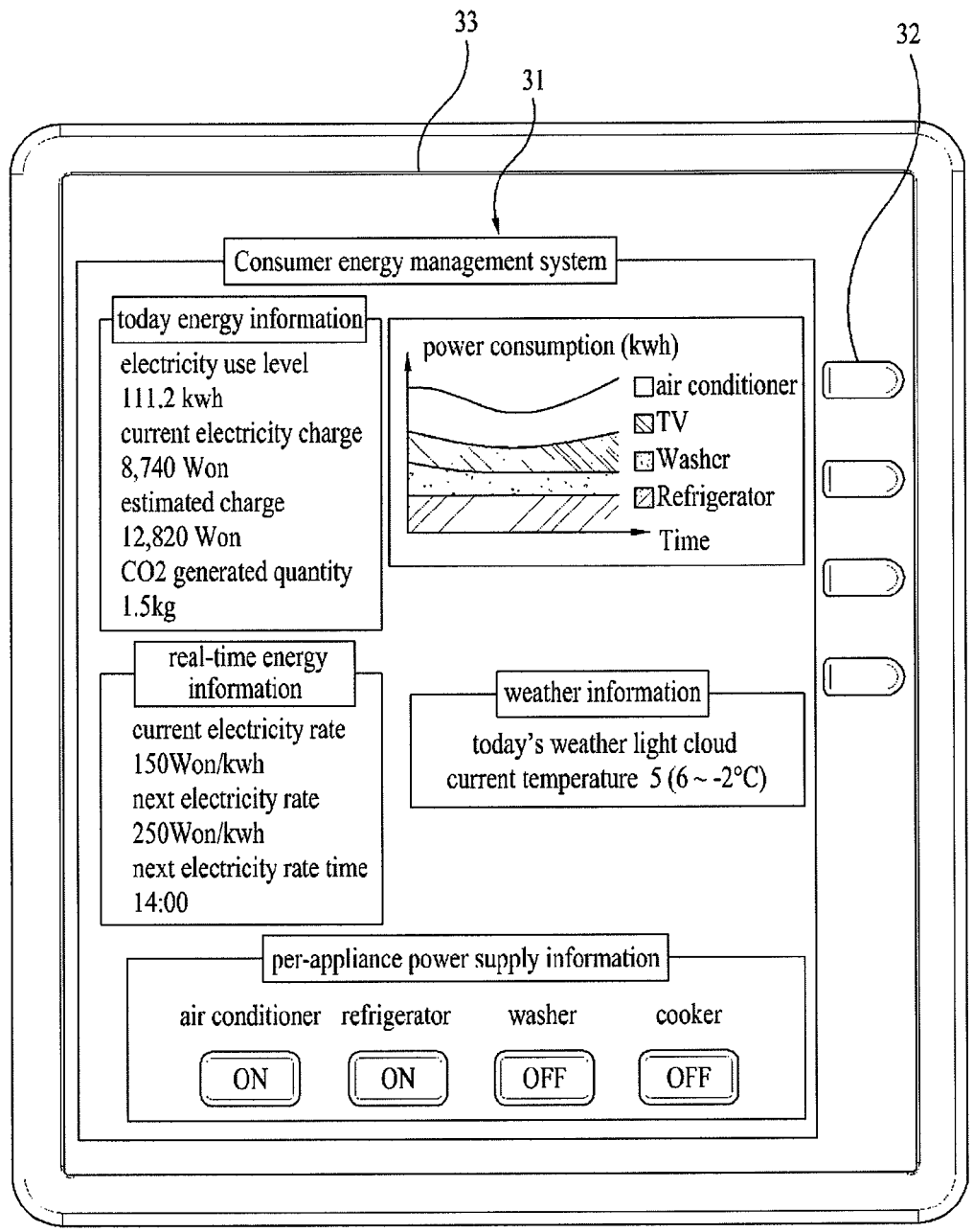
FIG. 3 is a diagram of an energy management system (EMS) according to one embodiment of the present invention.

FIG. 3 is a diagram of an energy management system (EMS) according to one embodiment of the present invention. All components of the EMS are operatively coupled and configured.

Referring to FIG. 3, the energy management system (EMS) 30 is configured as a terminal (e.g., communication terminal, computer laptop, tablet, etc.) provided with a touch panel 33 of the EMS 30. An image (e.g., text, graph, picture, symbols, etc.) 31 is displayed on the touch panel 33. In this case, energy information including a current electricity use level, an electricity charge, an estimated charge estimated on the basis of the accumulated history, a $CO_2$ generated quantity and the like, real-time energy information including an electricity rate in a current time interval, an electricity rate in a next time interval and an electricity rate varying time zone, and weather information, etc. can be displayed in the image 31 on the panel 33 of the EMS 30.

Moreover, the image 31 of the touch panel 33 can include a graph indicating a power consumption level of each electric appliance per time zone and its variation.

Besides, information on the presence or non-presence of power supplied to each appliance can be displayed in the image 31 as well. In this case, for example, an indication 'ON' (e.g., for the air conditioner and refrigerator in the shown image 31) can mean that the power management adapter 200 is playing a role as a medium for supplying power to the corresponding electric appliance. And, an indication 'OFF' can mean that the power management adapter 200 has cut off the power supply between the outlet and the corresponding electric appliance (e.g., the washer and cooker in the shown image 31) to prevent the standby power generation.

A button unit 32 configured to enable a user to set an operation of a corresponding electric appliance can be provided to one side portion of the image 31 or on the EMS terminal 30. Using this button unit 32, a user is able to set a user-specific power level to use or a limit of an electricity charge. According to this setting, the energy management system (EMS) 30 is able to control operations of the electric appliances.

Figure 4:
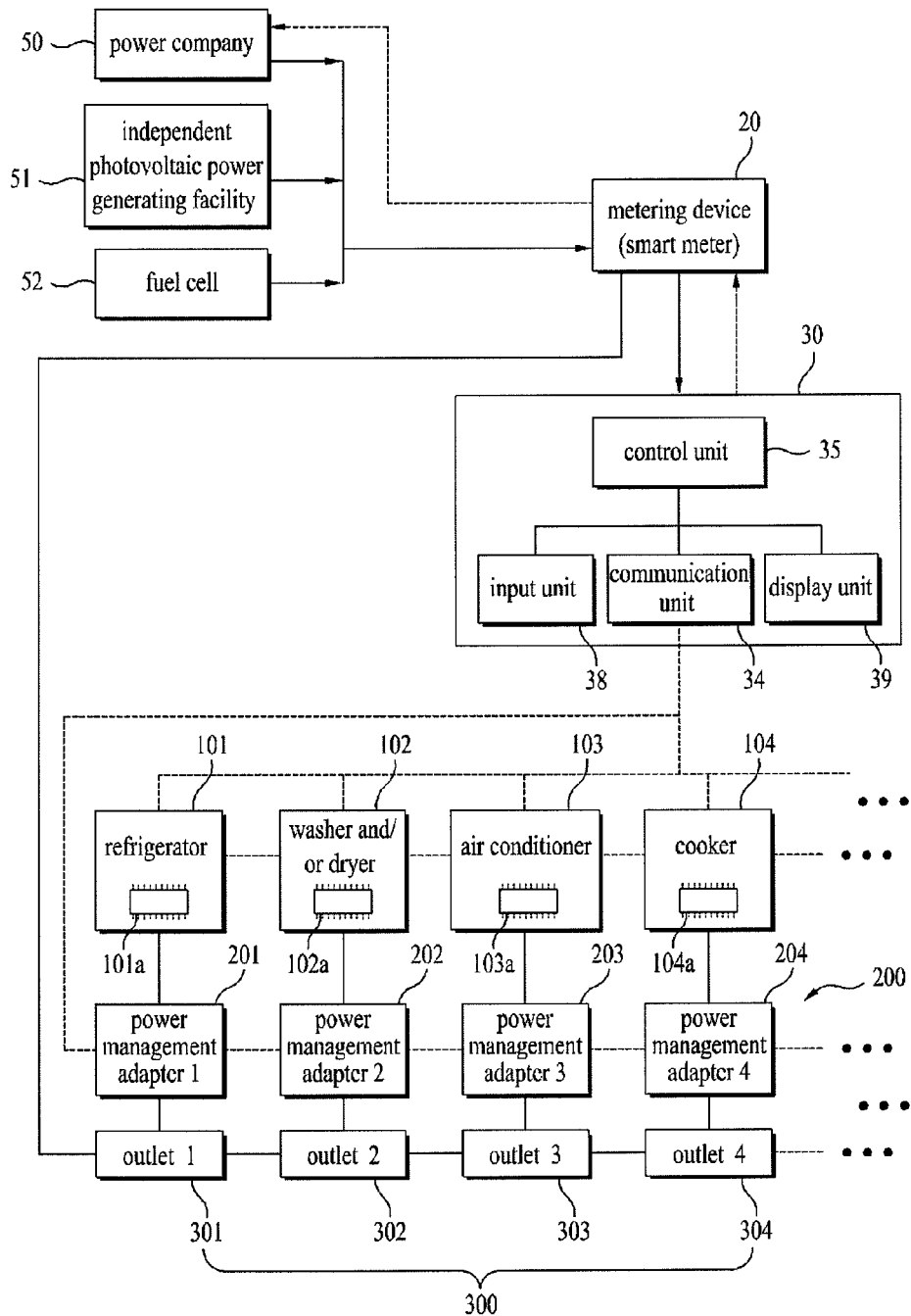
FIG. 4 is a block diagram of a power supply source under a smart grid and a power supply network system responsible for a power supply to electric home appliances according to an embodiment of the present invention.

FIG. 4 is a block diagram of a power supply source under a smart grid and a power supply network system responsible for a power supply to electric home appliances. All components of FIG. 4 are operatively coupled and configured.

Referring to FIG. 4, a power supply source can include a power company 50 having a general power generating equipment (thermal power, nuclear power, waterpower, etc.) or a power generating equipment using new recyclable energy (e.g., solar energy, wind power, geothermal heat, etc.). And, the power supply source includes an independent photovoltaic power generating facility 51 provided to each home, a fuel cell vehicle or a fuel cell provided to a home.

This power supply source is connected to the metering device (smart meter) 20. The metering device (smart meter) 20 is then connected to the energy management system (EMS) 30.

In particular, the energy management system (EMS) 30 includes a control unit 35, an input unit 38, a communication unit 34 and a display unit 39.

The communication unit 34 communicates with electric home appliances including, e.g., a refrigerator 101, a washer and/or dryer 102, an air conditioner 103, a cooker 104 and the like and plays a role in transceiving (receiving and/or transmitting) power and driving information of the electric home appliances.

Power management communication chips 101a to 104a are provided respectively within the electric appliances 101 to 104 to process information on the use of the electric appliances 101 to 104, respectively.

In this case, the power management communication chips 101a to 104a are provided to communicate with the energy management system (EMS) 30 and the power management adapters 200 to 204 and transceives such power information as power consumptions of the electric appliances with the energy management system (EMS) 30 and the power management adapters 200 to 204, respectively.

The control unit 35 acquires the setting information inputted via the input unit 38 by a user, history information of previously accumulated operations and used power of the electric appliances and an externally supplied power level by real time, controls operations of the electric appliances by processing the information by real time, and then controls powers supplied to the electric appliances.

Meanwhile, plugs of the electric appliances 101 to 104 can have the power management communication chips 101a to 104a inserted therein, respectively. And, the power management adapters 200 to 204 are connected to the outlets 310 to 304, respectively.

The power management adapters 200 to 204, which are provided to communicate with the communication unit 34 of the energy management system (EMS) 30, selectively perform power supply/cutoff to/from the electric appliances 101 to 104 under the control of the energy management system (EMS) 30, respectively.

Lines connected to the outlets 310 to 304 are connected to the metering device (smart meter) 20 to enable observation of real-time power supply statuses of the electric appliances 101 to 104 receiving powers from the outlets 310 to 304, respectively.

Figure 5:
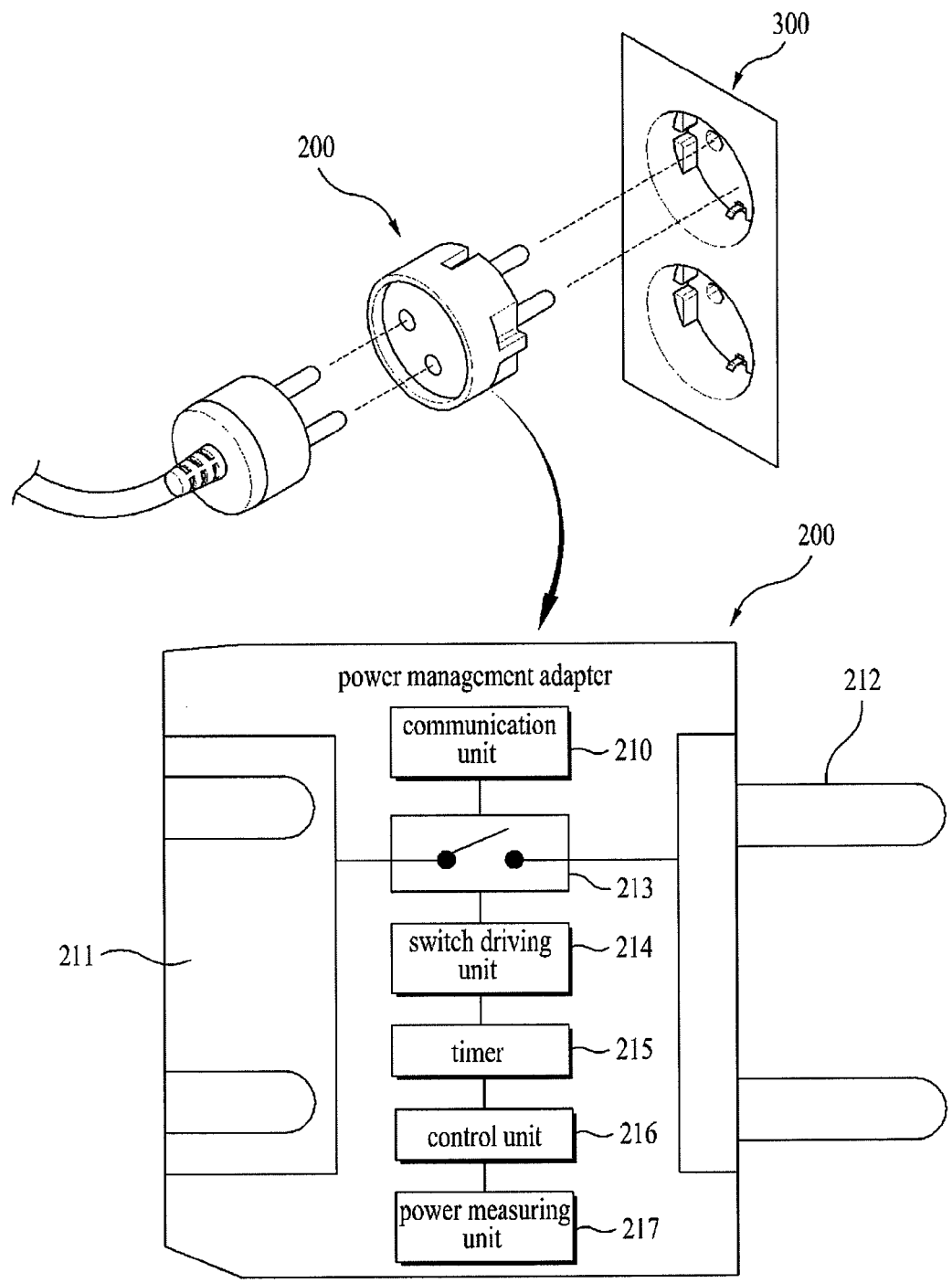
FIG. 5 is a schematic diagram of a power management adaptor according to an embodiment of the present invention.

FIG. 5 is a schematic diagram of a power management adaptor according to the present invention. In the course of implementing an automatic power control system by a smart server according to one embodiment of the present invention, each home appliance (or also referred to herein as a device) and the smart server transceive data with each other. For this data transceiving (receiving and/or transmitting), a smart chip can be loaded in the corresponding home appliance (device). As a variation, in order to implement the present system into an old or new device having the smart chip not loaded therein, the present invention provides a power management adapter designed such as shown in FIG. 5. Using the power management adapter shown in FIG. 5, power/monitoring information can be transceived between the smart server and each device. All components of the power management adapter 200 are operatively coupled and configured.

Referring to FIG. 5, the power management adapter 200 includes a communication unit 210 communicating with the energy management system (EMS) to receive a control command from the energy management system (EMS).

And, the power management adapter 200 includes a first connecting part 211 configured to have a plug of an electric appliance inserted therein and a second connecting part 212 connected to the outlet 300. The first connecting part 211 and the second connecting part 212 are selectively connected to each other by a switching unit 213. And, the switching unit 213 is activated by a switch driving unit 214 activated or controlled by the communication unit 210.

The switch driving unit 214 is connected to a timer 215 for calculating and announcing a time to delay an activation of the switch unit 213 for a prescribed duration. The timer 215 can also count down a time set by a control unit 216. The power management adapter 200 is provided with a power measuring unit 217 capable of measuring a power consumption quantity of the connected electric appliance.

And, a control unit 216 is provided within the power management adapter 200. In this case, the control unit 216 controls the operations of the switch driving unit 214 and cuts off or supplies power independently applied to an electric appliance without depending on the energy management system (EMS) 30 based on various kinds of information received from at least one of the communication unit 210, the timer 215 and the power measuring unit 217. The communication unit 210 or other unit can also communicate with the electric appliance whose plug is connected to the power management adapter 200. Through this communication, the control unit 216 can obtain any set time for the timer to count down and set the timer to perform the count down accordingly. The control unit 216 may determine to cut off the power to the connected electric appliance if the power measuring unit 217 indicates that the amount of power used is higher than a set reference (e.g., during the peak time). The control unit 216 may determine to cut off or supply power to the connected electric appliance based on a command from the smart server/EMS 30.

Basically, the power supply and cutoff of the electric appliance is performed by the energy management system (EMS) (cf. the reference number '30' in FIG. 3).

Yet, if a user manipulates the energy management system (EMS) 30 or the corresponding electric appliance to give a command for the power management adapter 200 to supply/cut off a power to/from the corresponding electric appliance independently, the power supply/cutoff can be performed by the power management adapter 200 according to the operation of the control unit 216. As such, the user can control the power management adapter 200 to selectively supply or cut-off power to or from the electric appliance. For example, when the electric rate (e.g., amount of money the user has to pay for using each unit of electricity/power) is considered to be high, then the user can configured the system (e.g., via the power management adapter 200) so that the power is cut-off for a certain time duration and then when the certain time duration expires, the power is automatically supplied back to the electric appliance.

Figure 6:
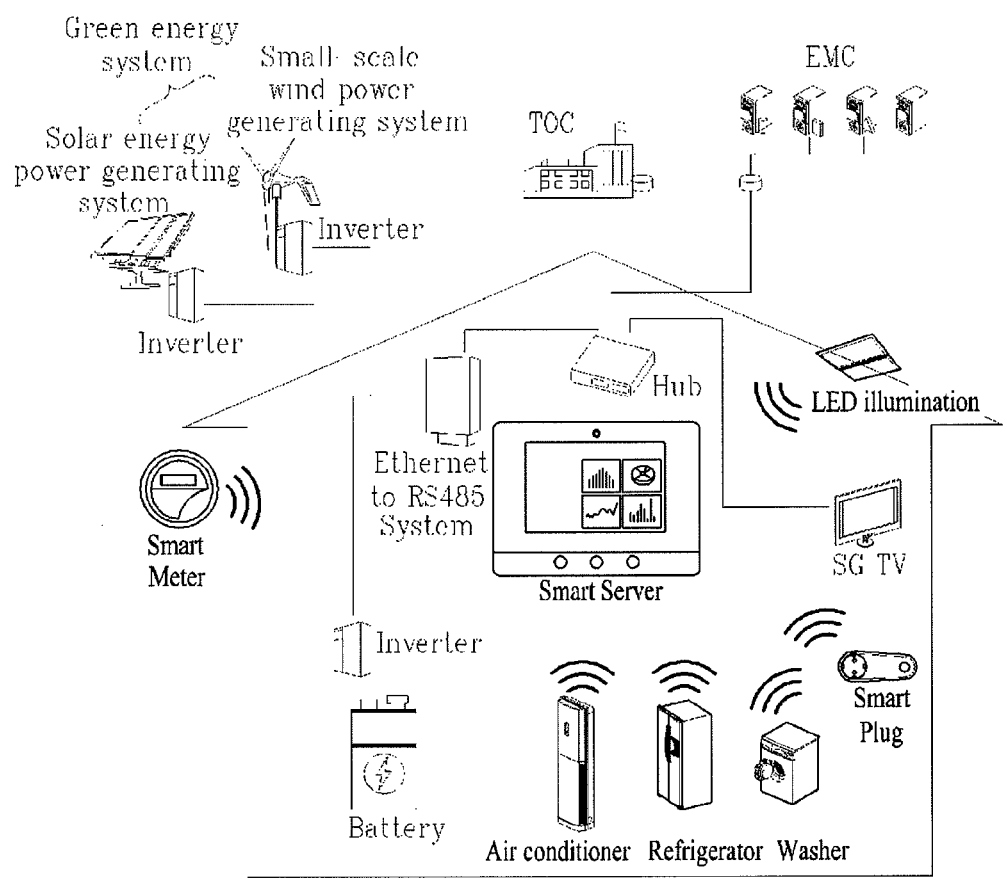
FIG. 6 is a diagram of a flow for data communications among a smart meter, home appliances (e.g., a smart grid TV can be excluded) inside home where the smart server is located, and a smart meter according to an embodiment of the present invention.

FIG. 6 is a diagram of a flow for data communications among a smart meter, home appliances (e.g., a smart grid TV can be excluded) inside a home where the smart server is located, and a smart meter. All components of FIG. 4 are operatively coupled and configured.

Meanwhile, in this disclosure, a smart server is mainly described as a separate server. Yet, the smart server can include a separate server itself, a smart grid TV, a mobile phone or the like.

A smart server according to one embodiment of the present invention can transceive signals with electric appliances and a smart meter according to Zigbee data protocol for example. Of course, the present invention can use other data protocols as needed.

FIG. 7 is a diagram of an example of output data output from the smart server shown in FIG. 6 or other figures.

Referring to FIG. 7, the smart server (e.g., EMS 30 or separate server) according to the present invention transmits a control signal (e.g., information on on/off, temperature setting, airflow, wind direction, etc.). The smart server transmits a control signal (e.g., information on on/off) to a washer. The smart server transmits a control signal (e.g., information on cooling/freezing temperature) to a refrigerator. The smart server transmits a control signal (e.g., information on on/off, information on dimming, etc.) to a LED illumination. The smart server transmits a control signal (e.g., information on standby power cutoff/restore) to a smart plug. In this case, the smart plug can be designed like the power management adapter 200 shown in FIG. 5. And, the smart server transmits a control signal (e.g., information on remote load cutoff) to a smart meter. In this case, the smart meter can correspond to the metering device (smart meter) 20 shown in FIG. 4.

Moreover, the smart server transmits other signals (e.g., information on firmware, etc.) to the smart meter. In case of attempting to upgrade the smart meter, a firmware file may be necessary. Therefore, the smart server can transmit the firmware file to the smart meter to upgrade it.

FIG. 8 is a diagram of an example of input data received by the smart server shown in FIG. 6 or other figures.

Referring to FIG. 8, the smart server according to one embodiment of the present invention receives information on a real-time power used amount from all sources and also receives information on a real-time power sales volume from a smart meter. These receptions can be performed by a unit of 5 minutes. The smart server receives information of appliance authentication from all sources and also receives information on alarm contents and time.

Moreover, the smart server receives a status signal (e.g., information on on/off) from the washer. The smart server receives a status signal (e.g., information on cooling/freezing temperature) from the refrigerator. The smart server receives a status signal (e.g., information on on/off, information on dimming, etc.) from the LED illumination. The smart server receives a status signal (e.g., information on standby power cutoff/restore) from the smart plug. And, the smart server receives a status signal (e.g., power rate information, used power information, peak time information, etc.) from the smart meter.

According to another embodiment of the present invention, the smart meter receives rate table information, DR (demand response) information, peak time information and the like from the TOC or EMC. And, the smart meter is able to transmit the received rate table information, DR (demand response) information, peak time information and the like to the smart server. In this case, the rate table information can mean rate information according to a power-used amount (amount of power used). The DR (demand response) information can mean information needed for a process of varying each home appliance or device automatically after the TOC or EMC has received a report on an electricity use status of each home and the like, for example. And, the peak time information can mean a time zone information identifying a peak power-used amount for example. And, a rate according to the used power can be set to a max level.

According to a further embodiment of the present invention, the smart server receives rate table information, DR (demand response) information, peak time information and the like from an IP network, for example. The smart server is able to re-transmit the received rate table information, DR (demand response) information, peak time information and the like to the smart meter and is able to further transmit them to each device.

The smart server receives reservation information, manual control information and the like from each home device or appliance.

FIG. 9 is a diagram of an example of a detailed type of the data shown in FIG. 7 or FIG. 8.

Referring to FIG. 9, the output data shown in FIG. 7 or the input data shown in FIG. 8 can be designed to allocate bytes to each field.

Figure 10:
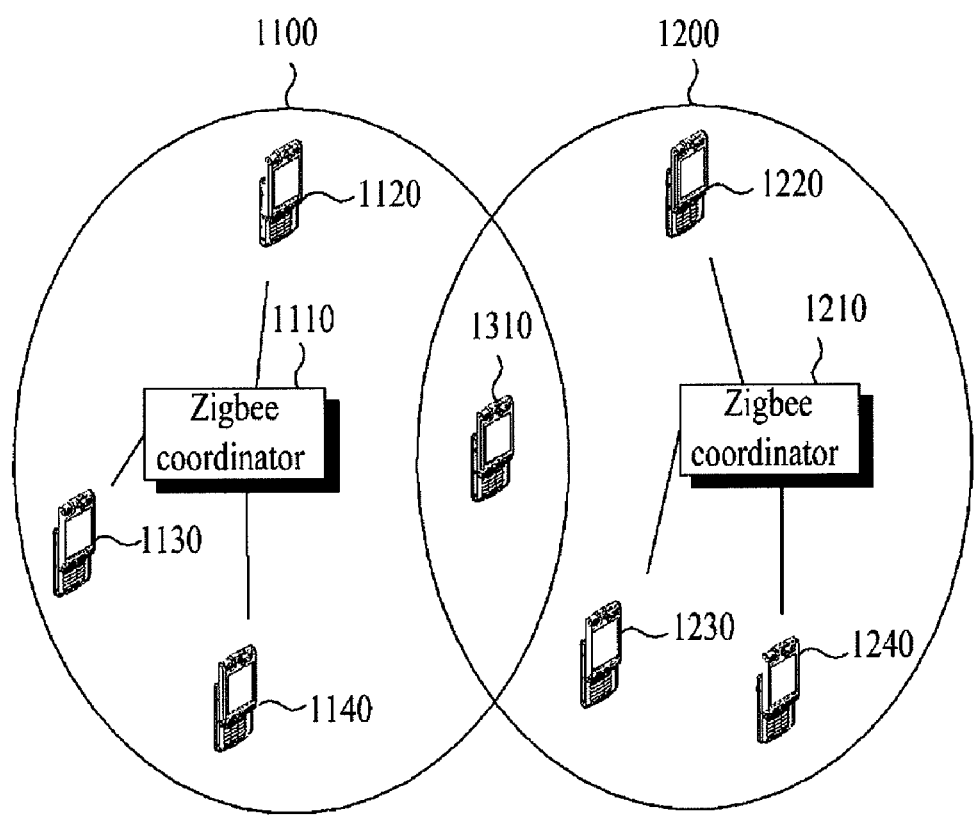
FIG. 10 is a conceptional diagram of a plurality of Zigbee networks and a terminal accessible to the Zigbee networks according to one embodiment of the present invention.
Figure 11:
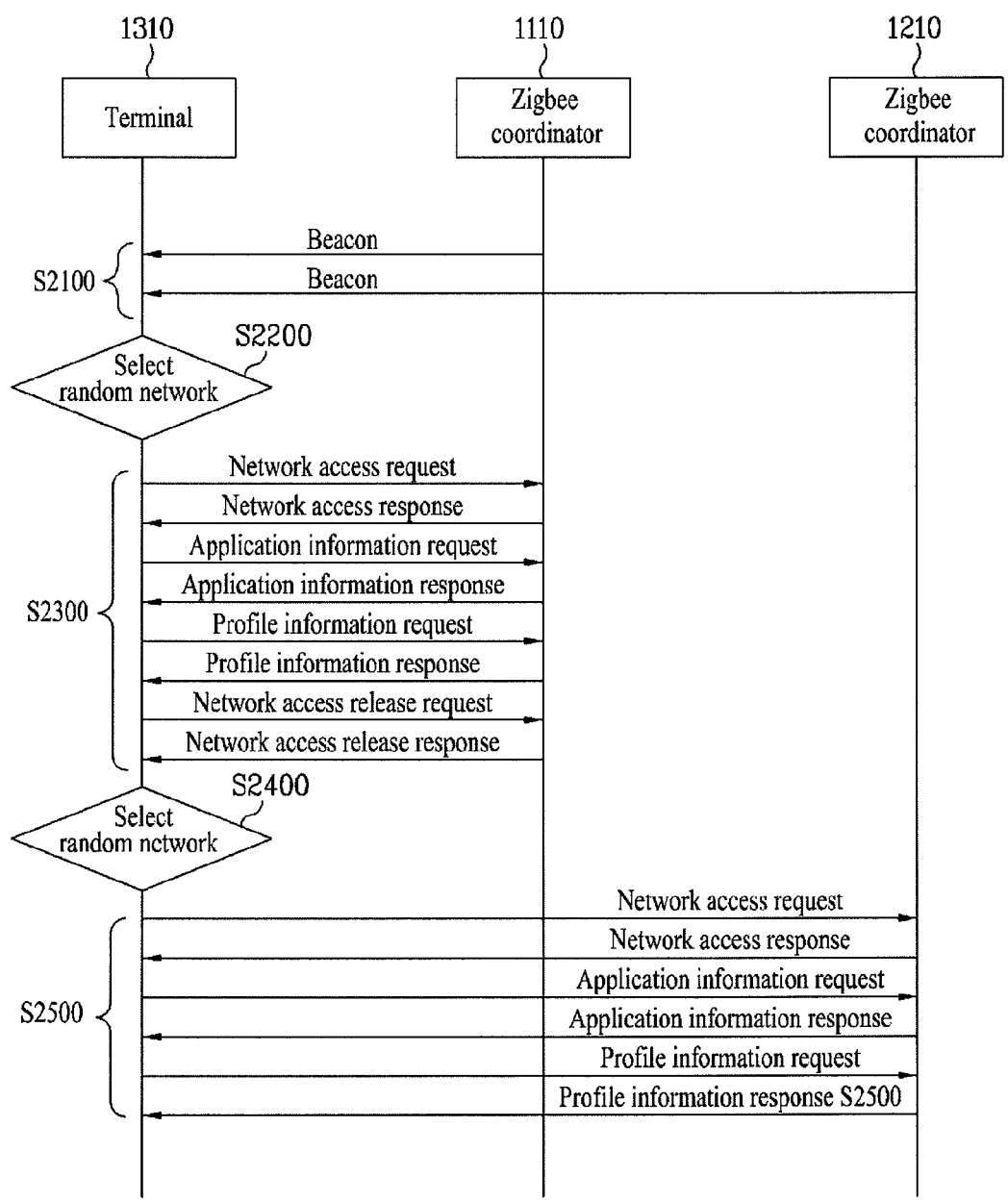
FIG. 11 is a diagram of data flow in a Zigbee communication system and method according to one embodiment of the present invention.
Figure 12:
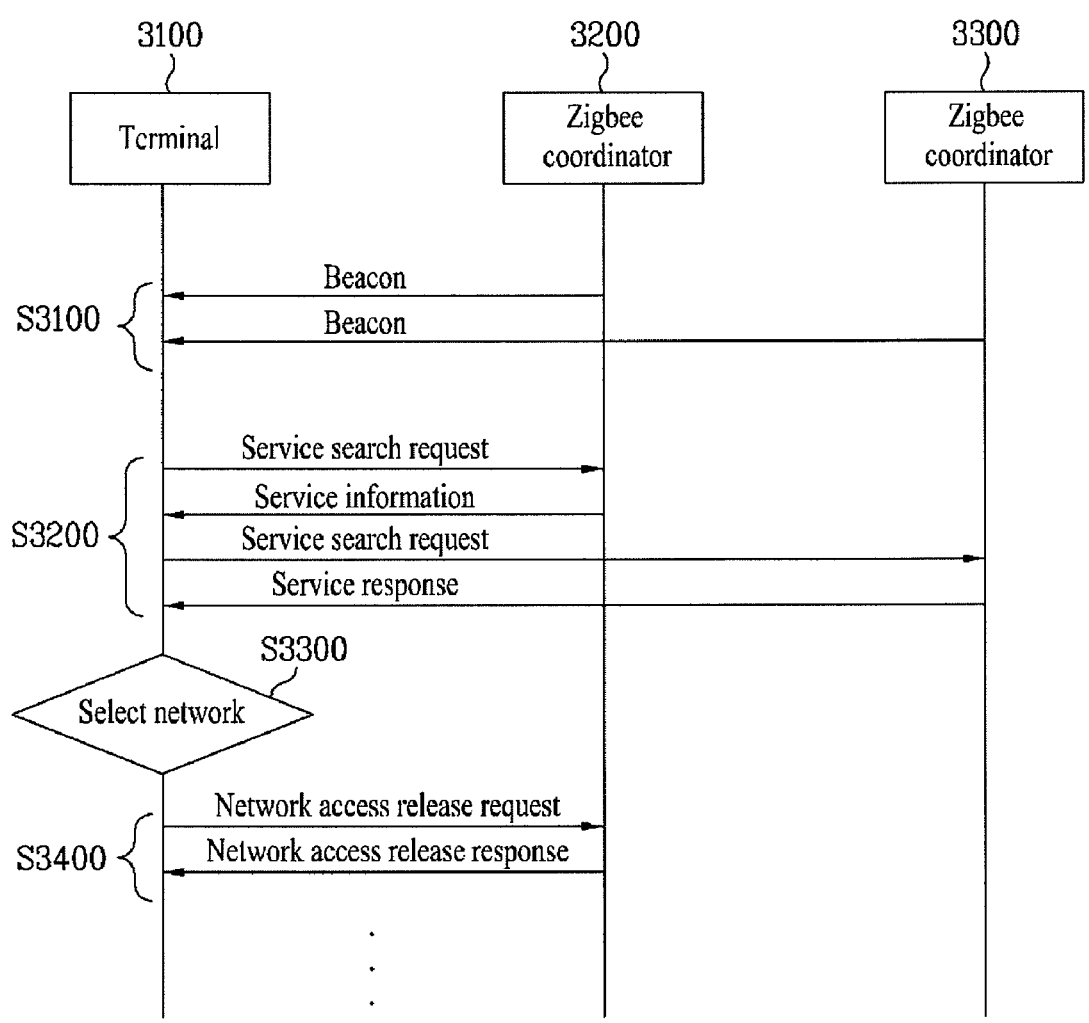
FIG. 12 is a flowchart of data in a Zigbee communication system and method for selectively accessing a Zigbee network according to one embodiment of the present invention.

FIG. 10 is a conceptional diagram of a plurality of Zigbee networks and a terminal accessible to the Zigbee networks according to one embodiment of the present invention. All components of FIG. 10 are operatively coupled and configured. FIG. 11 is a diagram of data flow in a Zigbee communication system and method according to one embodiment of the present invention, and FIG. 12 is a flowchart of data in a Zigbee communication system and method for selectively accessing a Zigbee network according to one embodiment of the present invention. Zigbee communication protocol applicable to the present invention is exemplarily described with reference to FIGS. 10 to 12 as follows. Yet, FIGS. 10 to 12 illustrate one embodiment for the understanding of the present invention, by which the scope of the appended claims and their equivalents is non-limited. The present invention is equally applicable to short-range communications (e.g., Wi-Fi, Bluetooth, mesh RF technology, binary CDMA, contactless, etc.) as well as Zigbee. FIG. 10 shows a case where a plurality of Zigbee networks 1100 and 1200 exist. And, a terminal 1310 located at a specific position is accessible to each of the Zigbee networks 1100 and 1200. Thus, when the plurality of the Zigbee networks exist, the system may be unable to know which one of the Zigbee coordinators 1110 and 1210 is accessed by a terminal that provides a user-specific service. Therefore, one of the Zigbee networks 1100 and 1200 is randomly selected and accessed and the corresponding search then proceeds.

FIG. 11 is a diagram of data flow for access and release of a terminal in case that a plurality of Zigbee networks exist according to one embodiment of the present invention. FIG. 11 is explained in detail as follows.

Referring to FIG. 11, when there exist a plurality of Zigbee coordinators 1110 and 1210 accessible by a terminal 1310 at a current location, each of the Zigbee coordinators 1110 and 1210 transmits a beacon [S2100]. In this case, the beacon is transmitted by each of the Zigbee coordinators 1110 and 1210 in a manner of being periodically loaded with various kinds of information. This information can include a PAN ID (personal area network ID), channel information and the like. This information is sufficient to identify each Zigbee network or recognize a channel currently used by the Zigbee network and does not include information on services of other terminals (1120, 1130, 1140)/(1220, 1230 and 1240) having accessed the corresponding Zigbee coordinator 1110/1210 having transmitted the corresponding beacon at all. The terminal 1310 randomly selects the Zigbee network from the received beacons [S2200]. Afterwards, the terminal 1310 performs a following procedure for searching services of the terminals 1120, 1130 and 1140 accessing the selected Zigbee coordinator 1110 [S2300]. First of all, the terminal 1310 makes a request for a network access request (join request) to the Zigbee coordinator 1110 of the Zigbee network 1100. In response to this request, the Zigbee coordinator 1110 makes a network access response (join response). If the terminal 1310 transmits an application information request (active EP request) to the Zigbee coordinator 1110, the Zigbee coordinator 1110 directly makes an application information response (active EP response). In this case, the application information request and the application information response are provided to search information on the application provided by each of the terminals 1120, 1130 and 1140.

The terminal 1310 makes a profile information request (simple descriptor request) to the Zigbee coordinator 1110 and then receives a profile information response (simple descriptor response). In particular, after the services of the terminals 1120, 1130 and 1140 have been searched, if it is determined that the terminal providing the user-specific service exists, the service is received.

Yet, if it is determined that the terminal providing the user-specific service does not exist, a network access release request (leave request) to the Zigbee coordinator 1110 and a network access release (leave response) is then received. Another Zigbee network 1200 is randomly and immediately selected [S2400]. And, a procedure for searching the services of the terminals 1220, 1230 and 1240 are performed again on the Zigbee coordinator 1210 of the selected Zigbee network 1200 [S2500]. Detailed signal transmission and response of this procedure are identical (or similar) to those of the step S2300.

FIG. 12 is a diagram of data flow for a Zigbee communication system and method, which can select and access a Zigbee network, according to one embodiment of the present invention. Referring to FIG. 12, the data flow between a terminal 3100 and one Zigbee coordinator 3200 or another Zigbee coordinator 3300 can be observed.

First of all, if each of the Zigbee coordinator 3200 and the Zigbee coordinator 3300 transmits a beacon, the terminal 3100 receives the corresponding beacons [S3100]. By receiving theses beacons, the terminal 3100 is able to search all Zigbee networks accessible at a current location. In particular, each of the Zigbee coordinators 3200 and 3300 transmits information on services of other terminals already accessing each of the Zigbee coordinators 3200 and 3300 as well as PAN ID and channel information on the corresponding beacon. According to the present embodiment, an identifier is separately determined for each type of the services of the terminals and used for the information on the service. This identifier is the information agreed for such a type of each terminal as a mobile communication terminal, a headphone, an audio player and the like. Thus, despite receiving the beacon only, the terminal 3100 can be aware that terminals providing specific services have accessed each of the Zigbee coordinators 3200 and 3300 having transmitted the beacons, respectively. This identifier can be included in one of a reserved field of superframe specification field of the beacon and a reserved field of a beacon payload.

Although a specific Zigbee coordinator can be accessed in a manner that services are searched using the identifier information only, the identifier information is generally simple information and may not provide detailed information. In case that several terminals having the same identifier exist, detailed information is necessary. Therefore, according to one embodiment of the present invention, a procedure for searching services in detail before accessing a Zigbee network is additionally provided as follows [S3200]. First of all, the terminal 3100 makes a service search request to each of the Zigbee coordinators 3200 and 3300 having transmitted the beacons and then receives service information from each of the Zigbee coordinators 3200 and 3300. In this case, the service information is the detailed information on the corresponding service. And, the terminal 3100 searches the terminal providing a specific service using this detailed information only. Therefore, a user of the terminal 3100 is able to select the Zigbee network in which the terminal providing the user-specific service exists [S3300].

Subsequently, the terminal 3100 accesses the selected Zigbee network according to the previous protocol [S3400]. Accordingly, the terminal 3100 searches the Zigbee network providing the specific service at once and then accesses the searched Zigbee network. And, the system is also advantageous in skipping an unnecessary access and release process.

Figure 13:
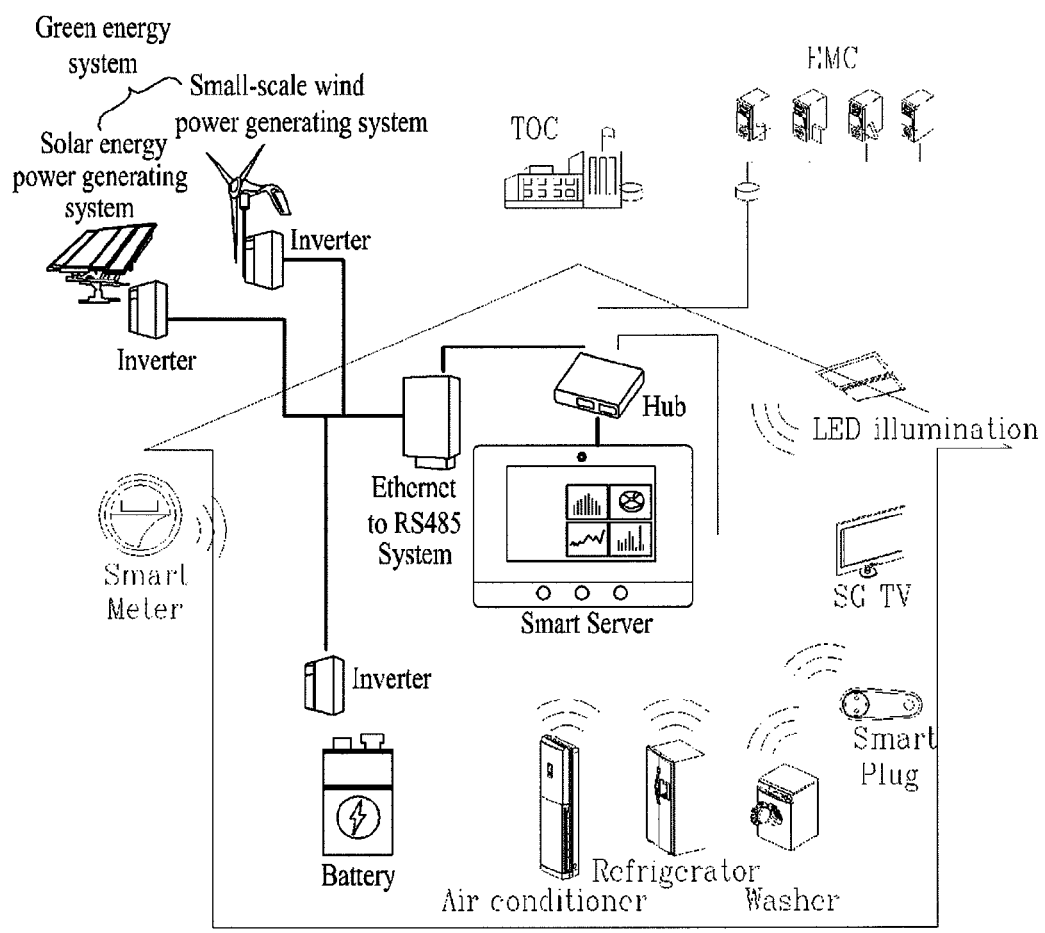
FIG. 13 is a diagram of a communication flow among a smart server, a green energy system and an inverter of a battery according to one embodiment of the present invention.

FIG. 13 is a diagram of a communication flow among a smart server, a green energy system and an inverter of a battery according to one embodiment of the present invention. All components of FIG. 13 are operatively coupled and configured.

Referring to FIG. 13, the smart server according to one embodiment of the present invention is able to transceive signals with a green energy system and an inverter of a battery by Ethernet to RS485 data protocol. Of course, the system is able to consider using other data protocols if necessary.

FIG. 14 is a diagram of an example of output data output from the smart server shown in FIG. 13 or other figures.

Referring to FIG. 14, the smart server according to one embodiment of the present invention transmits a control signal (e.g., information on system connection/disconnection, etc.) to all devices (e.g., electric appliances). And, the smart server transmits a control signal (e.g., information on time sync, etc.) to all devices. In this case, the time sync information is transmitted with a predetermined periodicity or can be transmitted at an initial moment that each of the devices is turned on only. And, the smart server transmits a control signal (e.g., information on a charging/discharging) to the battery of the device.

In this disclosure or drawings, a destination and a source are described. In case that data is transmitted to each device with reference to the smart server, the each device can be named a destination. In case of receiving data from each device with reference to the smart server, the each device can be named a source.

FIG. 15 is a diagram of an example of input data received by the smart server shown in FIG. 13 or other figures.

Referring to FIG. 15, the smart server according to one embodiment of the present invention receives information (e.g., periodicity of time unit such as 5 minutes) on a real time generated power amount from a photovoltaic power generating system. The smart server receives information (e.g., periodicity of time unit such as 5 minutes) on a real time generated power amount from a small-scale wind power generating system. The smart server receives information (e.g., kw unit, & unit/%, etc.) on a real time charged quantity from a battery. And, the smart server receives information on the system connection/disconnection from TOC, EMC or the like.

The smart server can include a power system connected to the TOC or the green energy system. The smart server receives information indicating whether to connect or disconnect the aforesaid power system from the TOC, the EMC or the like. Afterwards, the smart server transmits the received information to an inverter side of the green energy system. According to this information, the power system is connected or disconnected. FIG. 16 is a diagram illustrating an example of a detailed type of the data shown in FIG. 14 or FIG. 15. Referring to FIG. 16, the output data shown in FIG. 14 or the input data shown in FIG. 15 can be designed to allocate bytes to each field.

Figure 17:
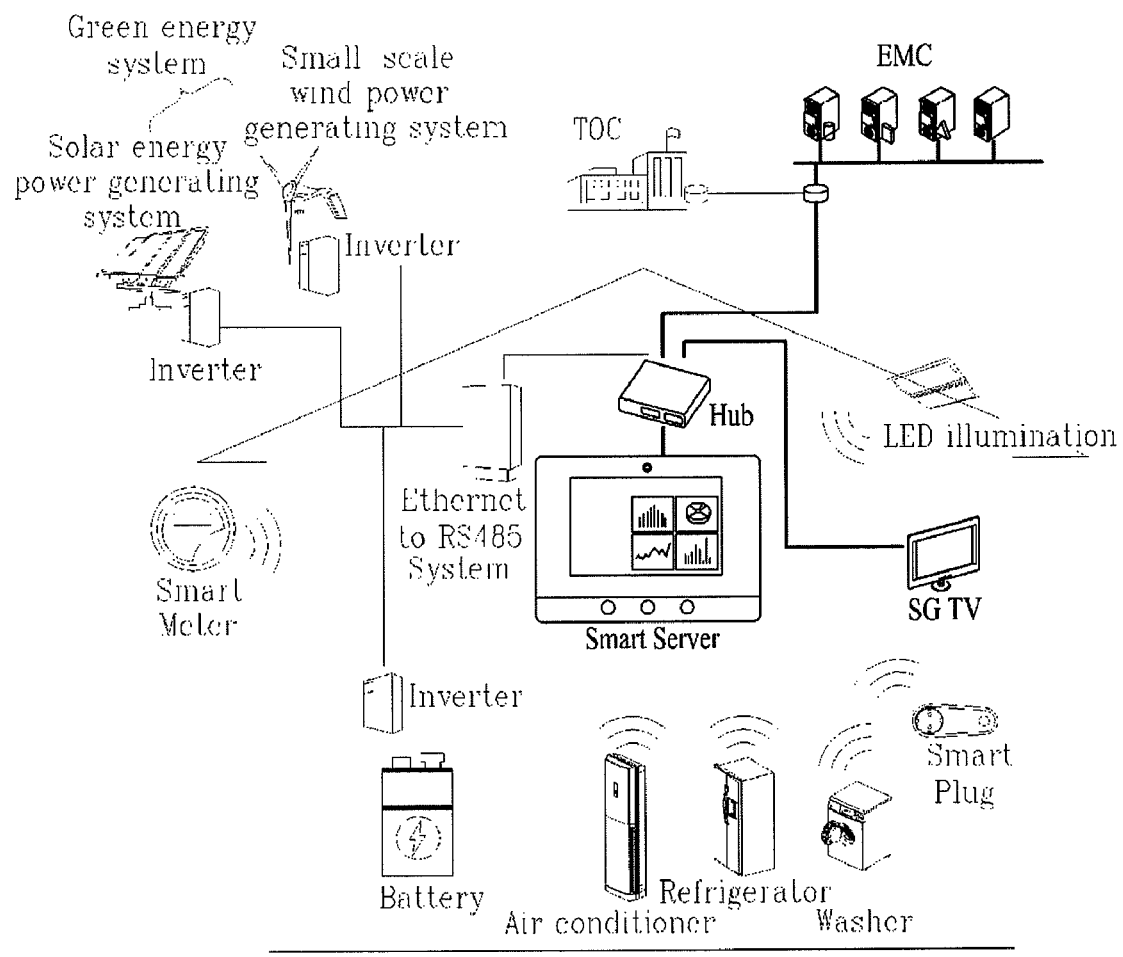
FIG. 17 is a diagram of data communication flow among a smart server, a smart grid TV and an EMC (emergency management center) according to one embodiment of the present invention.

FIG. 17 is a diagram of data communication flow among a smart server, a smart grid TV and an EMC (emergency management center) according to one embodiment of the present invention. All components of FIG. 17 are operatively coupled and configured.

Referring to FIG. 17, the smart server according to one embodiment of the present invention is able to transceive data of XML file format with the smart grid TV and a management center (EMC) by TCP/IP Socket, for example. Of course, the system is able to consider using another data protocol if necessary.

FIG. 18 is a diagram of an example of output data output from the smart server shown in FIG. 17 or other figures.

Referring to FIG. 18, the smart server according to one embodiment of the present invention transmits information on a per-household used power amount (amount of power/electricity used) to an EMC. And, the smart server transmits information on a per-household generated power amount to the EMC. And, the smart server transmits real-time information, history information and the like to a smart grid TV (SG TV). Since a security function is loaded on the smart server according to one embodiment of the present invention, this design can prevent a problem which may be caused by a manipulation of information in advance.

As a variation, the smart meter can directly transmit the information on the per-household used power amount to the EMC or can be designed to transmit the corresponding information to the smart server.

FIG. 19 is a diagram of an example of input data received by the smart server shown in FIG. 17 or other figures.

Referring to FIG. 19, the smart server according to one embodiment of the present invention receives rate information (e.g., Korean Won/kW unit, dollar/kW, etc.), time information and the like from the EMC. The smart server receives information on a used electricity amount (e.g., amount used in the previous month) from the EMC. The smart server transmits information on control information on a home appliance or a new recyclable energy power generating system from the smart grid TV. The smart server transmits information on weather, outdoor temperature, wind direction, wind speed and the like from the EMC. The smart server transmits information on alarm or event from the smart grid TV or the EMC. And, the smart server transmits information on firmware from the EMC.

As mentioned in the foregoing description, the smart server according to one embodiment of the present invention can receive the weather information and the like from the EMC in addition, for example. Moreover, according to another example of the present invention, the smart server is able to directly receive the weather information and the like via a server operated by a weather bureau or the like.

FIG. 20 is a diagram of an example of a TCP header according to one embodiment of the present invention.

Referring to FIG. 20, a TCP protocol according to one embodiment of the present invention is configured with a conventional structure to meet the compatibility with an IP network, e.g., each sever on internet. For instance, 65,536 ports for transmission and reception can be defined. And, a 32-bit field for a sequence number can be configured. Details are explained as follows.

1. Source port number (e.g., 16 bits): port number of a transmitting side

2. Destination port number (e.g., 16 bits): port number of a receiving side
3. Sequence number (e.g., 32 bits): sequence number of a received packet
4. Acknowledge sequence number (e.g., 32 bits): sequence number of an acknowledged packet
5. Header length (e.g., 4 bits): length of a TCP header
6. Reserved (e.g., 6 bits): reserved field
7. Flag (e.g., 6 bits): flag defining a specification of packet
8. Window size (e.g., 16 bits): size of receivable window (buffer)
9. Checksum (e.g., 16 bits): checksum for error control
10. Urgent pointer (e.g., 16 bits): offset of an urgent packet transmitted in case of using a URG flag among flags As mentioned in the enumeration of the foregoing description, the TCP header can be constructed with total 20 bytes including each information element. And, every packet transmitted from one end portion to the other end portion is transmitted by including the above-enumerated header.

FIG. 21 is a diagram of a TCP header according to another example of the present invention, in which a header of TCP is reduced from that shown in FIG. 20.

Referring to FIG. 21, a TCP header according to another example of the present invention has a length of total 11.2 bytes. This will be explained in detail in the following description. Specifically, in case of a smart server mainly mentioned in the description of the present invention, it can be implemented with transmission and reception of further abridged data. Therefore, it is able to implement one embodiment of the present invention using the reduced TCP header shown in FIG. 21. This is just exemplary and another TCP header of a difference type is available as well.

1. Source port number: 8-bit port number of a transmitting side
2. Destination port number: 8-bit port number of a receiving side
3. Sequence number: sequence number of 16-bit received packet
4. Acknowledge sequence number: sequence number of 16-bit acknowledged packet
5. Header length: length of 4-bit TCP header
6. Reserved: unused
7. Flag: flag for defining specification of 6-bit packet
8. Window size: size of 8-bit receivable window (buffer)
9. Checksum: 16-bit checksum for error control
10. Urgent pointer: 8-bit URG flag Therefore, the case shown in FIG. 21 can minimize the overhead of the TCP header rather than the case shown in FIG. 20. And, the case shown in FIG. 21 can maximize the utilization of radio resources using a minimum overhead in transmitting/receiving user data.

FIG. 22 is a table of TCP header information mapping between a reduced TCP header according to another embodiment of the present invention and a TCP header according to one embodiment of the present invention.

Referring to FIG. 22, in case of using a reduced TCP header according to another embodiment of the present invention, a TCP header information mapping table is provided for the mapping to the TCP header information according to one embodiment of the present invention. For instance, if a TCP port number is 21, a port number of a reduced TCP is 1. If a TCP port number is 25, a port number of a reduced TCP is 3. This port number is applicable to both of a source port number and a destination port number. Moreover, the TCP header information mapping table can represent an acknowledge sequence number as well as the port number [not shown in the drawing].

Figure 23:
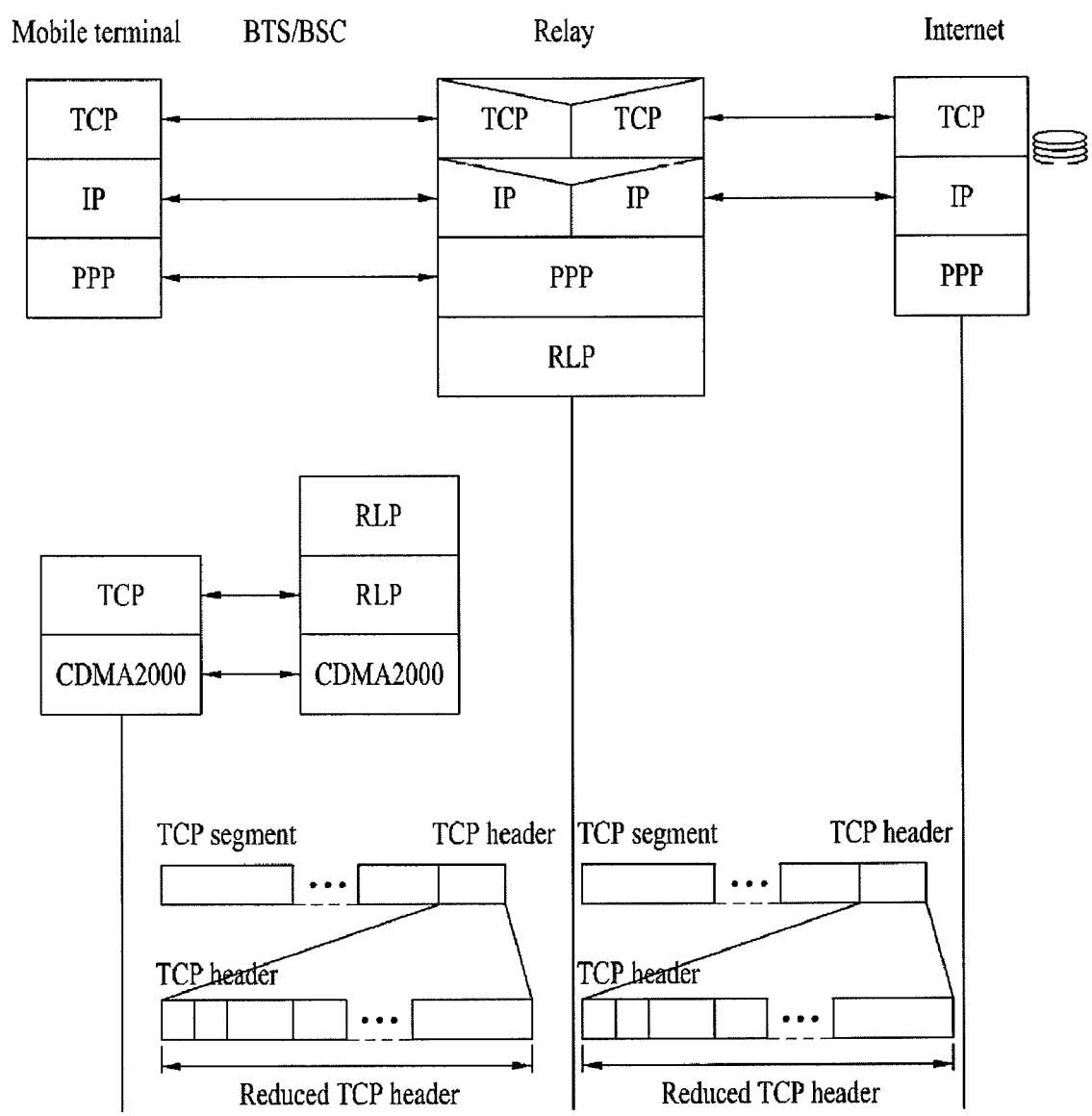
FIG. 23 is a diagram for data flow via a reduced TCP header according to another embodiment of the present invention.

FIG. 23 is a diagram for data flow via a reduced TCP header according to another embodiment of the present invention.

Referring to FIG. 23, a terminal according to one embodiment of the present invention transmits data using a reduced TCP header. Here the terminal can be a smart server, electric appliance, or any other device/server. A relay converts the reduced TCP header to an original TCP header and then performs transmission. In particular, the terminal according to one embodiment of the present invention determines a prescribed TCP header to use and is then able to set the TCP header according to the determination. Moreover, the determination can be made using an IP address.

Meanwhile, in case that a TCP header within a received data is a reduced header, a relay, which is a receiving stage, can determine whether to convert the TCP header to an original TCP header. For instance, in case that data is transmitted to the Internet using the original TCP header (non-reduced TCP header), the reduced TCP header is converted to the original TCP header and the data is then relayed [FIG. 23].

In case of data transmitted to a terminal from the Internet, the data includes the original TCP header. A relay receives and converts the original TCP header to a reduced TCP header and then transmits the reduced TCP header to the terminal.

Moreover, in transmitting data received from the Internet to a terminal, the relay can transmit the data intact to the terminal without performing the TCP header conversion. In this case, the header converting process is not necessary.

Figure 24:
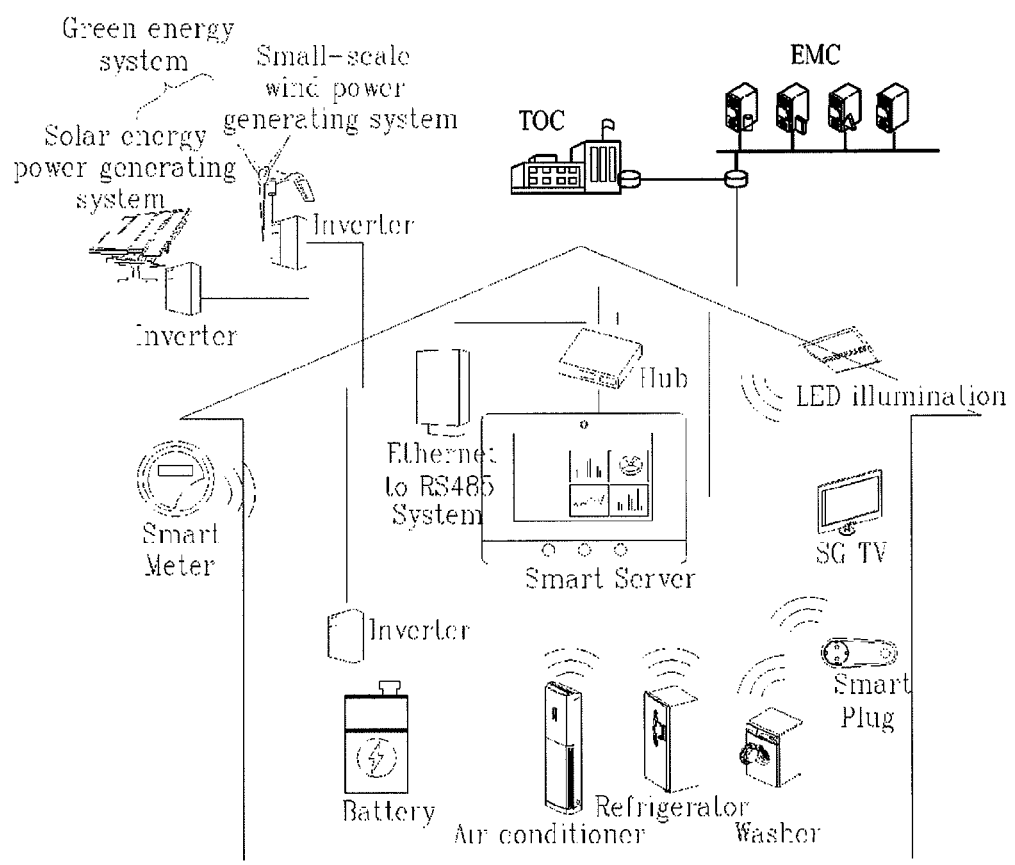
FIG. 24 is a diagram of data communication flow between an emergency management center (EMC) and a power supply source (total operating center: TOC) according to an embodiment of the present invention.

FIG. 24 is a diagram of data communication flow between an emergency management center (EMC) and a power supply source (total operating center: TOC). All components of FIG. 24 are operatively coupled and configured.

Referring to FIG. 24, according to one embodiment of the present invention, a management center (EMC) and a TOC (total operating center) can transceive data of XML file format by TCP/IP Socket. Of course, it is able to consider using another data protocol.

FIG. 25 is a diagram of an example of data transmitted to the TOC (total operating center) by the EMC shown in FIG. 24.

Referring to FIG. 25, an EMC according to one embodiment of the present invention transmits a used power amount, a generated power amount, other power information and the like to the TOC.

FIG. 26 is a diagram of an example of data transmitted from the TOC (total operating center) to the EMC shown in FIG. 24.

Referring to FIG. 26, the TOC according to one embodiment of the present invention transmits market information, metering information, system information and the like to the EMC.

As the TCP protocol is sufficiently explained in the descriptions with reference to FIGS. 20 to 23, the invention implements the configurations shown in FIGS. 24 to 26.

Figure 27:
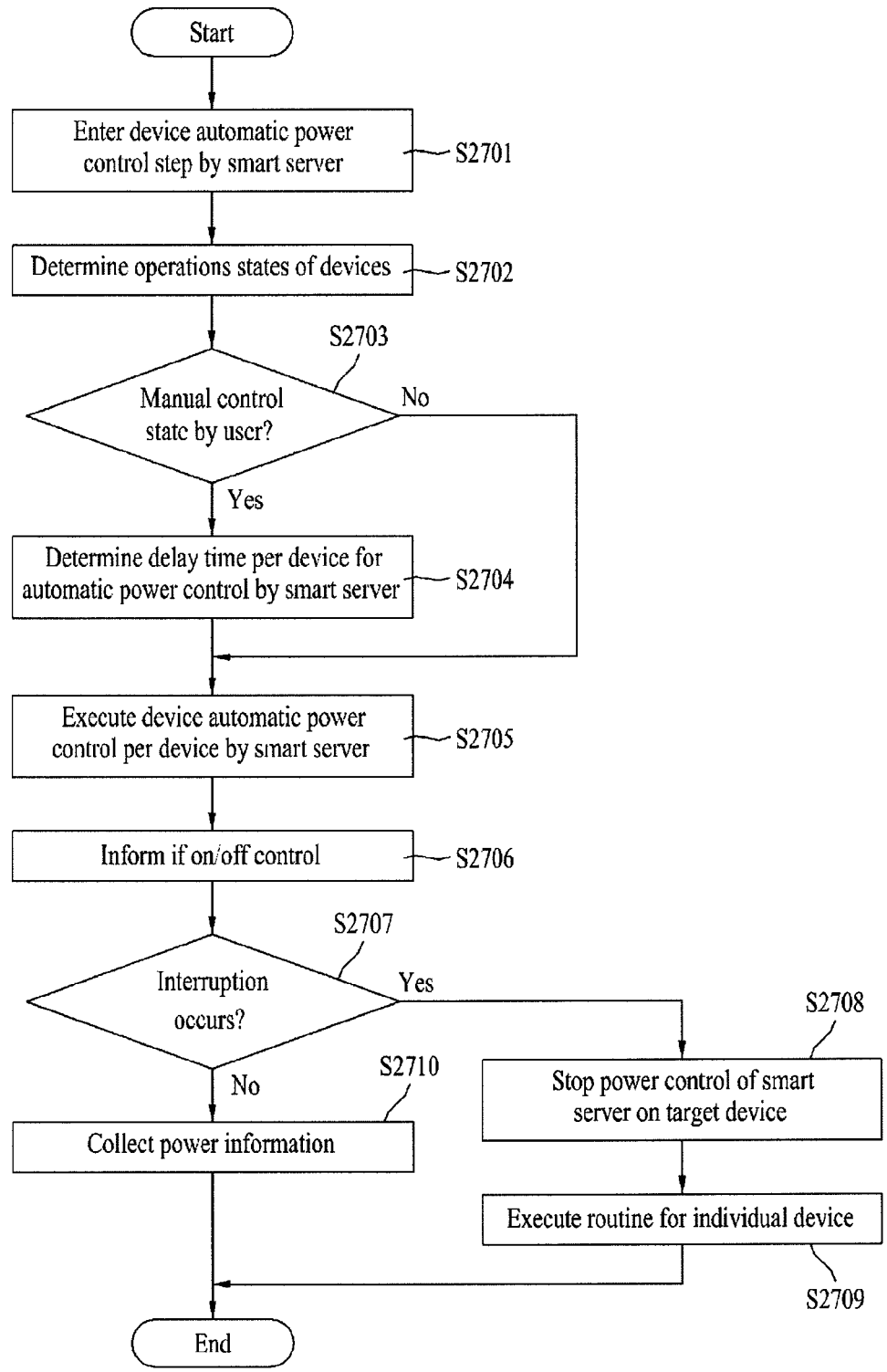
FIG. 27 is an overall flowchart of a controlling method according to one embodiment of the present invention.

FIG. 27 is an overall flowchart of a controlling method according to one embodiments of the present invention. The methods of FIG. 27 or any other figures can be implemented in any of the systems discussed according to the various embodiments of the invention.

In the following description, a controlling method according to one embodiments of the present invention is explained overall with reference to FIG. 27.

Referring to FIG. 27, according to one embodiment of the present invention, a device automatic power control step by a smart server is entered [S2701].

The smart server determines an operational state of each device, e.g., each electric appliance controllable by the smart server [S2702]. For instance, the smart server collects an on/off (device on/off) state, a setting state of a function, and information on whether a currently executed function is executed by an automatic control or a manual control. The smart server determines whether a current status of each device is attributed to a manual control conducted by a user [S2703].

As a result of the determination, if the current status is attributed to the manual control (e.g., the appliance is currently in a manual control mode selected by the user), a delay time per device for the automatic power control by the smart server is determined [S2704]. This delay time identifies a length of time that the manual control mode should be sustained for the appliance/device. This delay time determination may be made based on the user's history on the use of the appliance, power rate information received from the server, current time/date information, etc. After the delay time passes, the automatic power control per device by the smart server is executed [S2705]. For instance, after the delay time set for the manual control mode expires, the smart server automatically changes the mode of the appliance back to the automatic power mode in which the power is controlled/supplied by the smart server. Examples of step S2705 are explained in detail as follows.

First of all, the smart server according to one embodiment of the present invention may not perform a defrost operation of a refrigerating device (e.g., a refrigerator, etc.) in peak time (e.g., when the electric rate is set high). In this case, the defrost operation is the function of removing ice condensed on a surface of an evaporator of the refrigerating device and the like. In this case, the generation of the excessive power consumption is taken into consideration. Moreover, in the peak time, a specific function (e.g., a washer operation at a timing point of nearly completing a washing action, a microwave range operation at a timing point of nearly completing cooking) of a specific device is not forced to be turned off.

Meanwhile, when a device is operating according to a user's manual action (e.g., a command for reservation, a command for immediate execution), the system is able to turn off power of each device in the peak time. Further, the method may inform the user of relevant information or alert the user about the on/off control of the appliance. This is shown in the following step S2706. The user can be alerted in various ways, e.g., by displaying images, texts, signs, etc. on the screen associated with the appliance or smart server, by outputting audio sounds or alarms via a speaker associated with the appliance or smart server, by sending messages to the user's smart phone, etc.

Even if an unexpected peak time is generated, as mentioned in the foregoing description, a user is informed of the relevant information or alerted. And, the corresponding device can be activated according to a confirmation (e.g., yes or not) made by the user. If the confirmation is not made, it is able to transmit the relevant information periodically and repeatedly for a set time duration or until the confirmation is received by the user.

On the contrary, as a result of the determination at step S2703, if the current status is not attributed to the manual control, the method proceeds to step S2705 directly.

Moreover, in case that the automatic power control changes the power status itself of each device (e.g., ON state is changed into OFF state, and vice versa, etc.), the relevant information is announced [S2706]. In order to implement step S2706, the relevant information can be displayed on a screen of the smart server or can be transmitted to a mobile phone, a PMP, a laptop and the like.

The smart server determines whether an interruption has occurred [S2707]. As a result of the determining step S2707, if the interruption has occurred, the automatic power control over the target device by the smart server is stopped and each device is monitored [S2708]. This interruption can be any event which can allow the smart server to stop the power control mode of the device, and can be an input by the user, a system/device failure, receipt of a notification of peak power rate being applied, etc. After step S2708, a routine for monitoring or controlling an individual device is executed under control of the smart server [S2709]. In that case, the device can be checked or other appropriate operation may be performed. On the contrary, if the interruption does not occur, the following step S2710 is directly performed.

The smart server collects power information at step S2710. The power information can be information on the power used by the appliance, power rate information applicable to the appliance, etc.

Meanwhile, the steps shown in FIG. 27 are just examples to implement the present invention. Another embodiment of the present invention can be implemented using the steps in part or by adding different features, in accordance with necessity of the ordinary person having the skills in the field to which the present invention pertains. And, details of each of the steps will be explained with reference to the accompanying drawings as follows.

Figure 28:
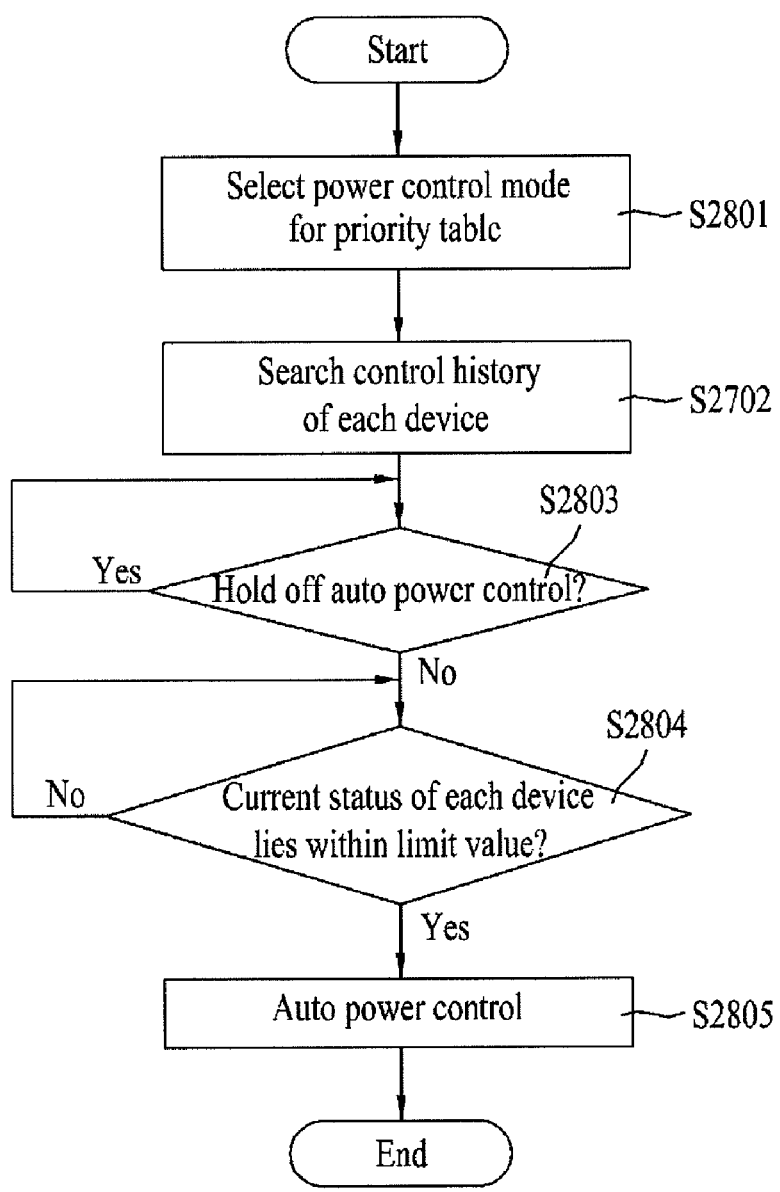
FIG. 28 is a flowchart of a method of controlling a smart server according to a first embodiment of the present invention.

FIG. 28 is a flowchart of a method of controlling a smart server according to a first embodiment of the present invention. In the following description, a method of controlling a smart server according to a first embodiment of the present invention is explained with reference to FIG. 28.

Referring to FIG. 28, a smart server according to one embodiment of the present invention manages at least one or more devices within a home supplied with power. In this case, the devices include various home appliances (e.g., TV, air conditioner, refrigerator, washer, illumination, etc.) or can include other devices if necessary.

First of all, the smart server according to one embodiment of the present invention selects a power control mode for a priority table indicating a type and function of a device that becomes a target of a power control [S2801]. For instance, the user can dictate how the power can be used by the devices (e.g., by prioritizing when the power can be used and in which order of the appliances), and such information can be stored in the priority table. According to the priority information, then the smart server decides that the power control of the present invention is to be applied to a certain device (e.g., selected to have the top/high priority).

The smart server searches the control history of each of the devices (or applicable device(s)) [S2802] and then determines whether to hold off on an automatic power control of each of the devices during a delay time based on the searched control history [S2803]. In this case, the delay time can mean a time delayed for each of the devices ready to be taken to an auto control mode by the smart server for example. That is, the delay time can be the length of time that the appliance can be maintained in the manual (or other) power control mode before it enters the automatic power control mode. Of course, each of the devices can have the same delay time occasionally.

The smart server determines whether a current status of each of the devices lies within a limit range [S2804]. For instance, the smart server can check the status and other information of the device and compare it with certain set criteria (e.g., time, temperature, etc. as shown in FIGS. 33-35), and if the status/information of the device falls within the set criteria, then the auto power control on the device is performed. That is, as a result of the determining step S2804, if the current status/information of the device lies within the limit range (or set criteria), the smart server applies the auto power control of each of the devices in the order of the devices arranged in the priority table [S2805].

Accordingly, according to the above described embodiment of the present invention, the method overcomes the user's inconvenience caused in case of lowering a power control unconditionally. In particular, according to one embodiment of the present invention, since a presence or non-presence of the auto power control and an extent thereof are determined according to a result of combination of 3 kinds of elements including a power control mode, a delay time and a limit range, the invention is able to efficiently lower the power consumption of each device without causing a rapid change in the use of the device to a user.

Meanwhile, the above described power control mode will be explained in detail with reference to FIG. 31, the above described delay time will be explained in detail with reference to FIG. 32, and the above described limit range will be explained in detail with reference to FIGS. 33 to 35.

Figure 29:
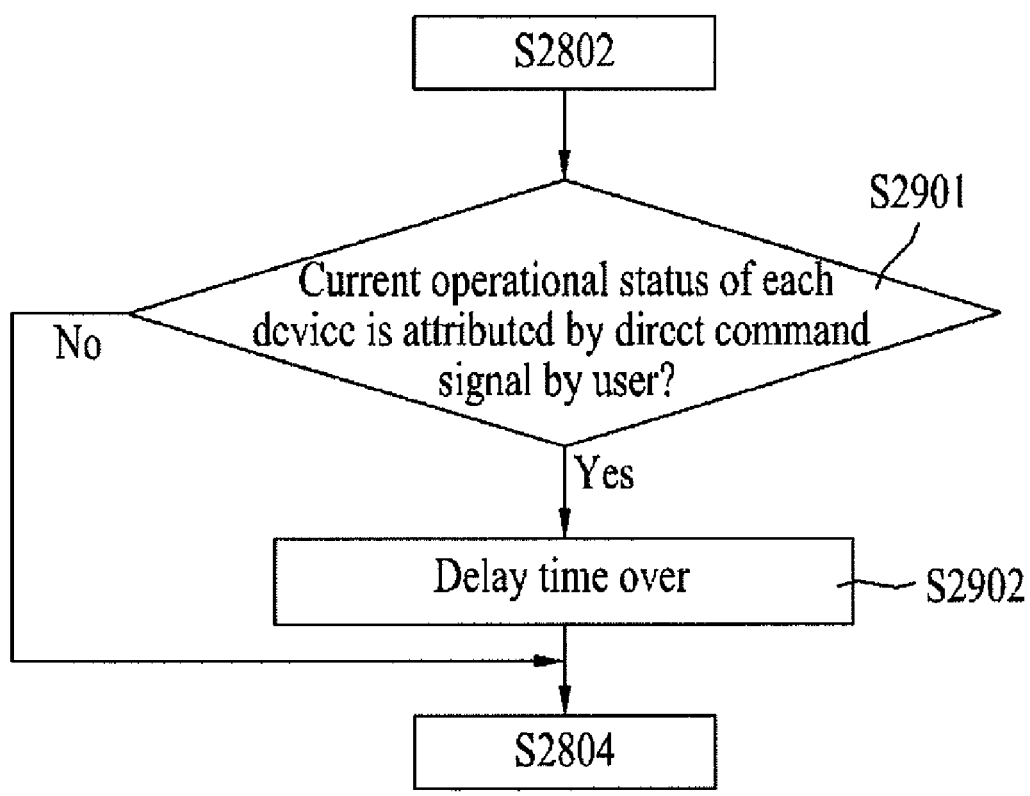
FIG. 29 is a flowchart of another embodiment for implementing step S2803 shown in FIG. 28.

FIG. 29 is a flowchart of another embodiment for implementing step S2803 shown in FIG. 28. In the following description, another embodiment for implementing step S2805 shown in FIG. 28 is explained with reference to FIG. 29.

Referring to FIG. 29, based on the searched control history, the smart server according to one embodiment of the present invention determines whether a current operational status of each device is caused by a direct command signal inputted by a user [S2901].

For example, if the current operational status of each device is caused by the direct command signal inputted by the user, it corresponds to a case that the user directly controls a function of the corresponding device, a case that the user directly controls the function of the device using the smart server, or a case that the user directly controls the function of the device using the smart grid TV.

As a result of the determining step S2901, if the current operational status of each device is caused by the direct command signal inputted by the user, the smart server controls the determining step S2804 to be executed after the delay time has passed [S2902].

On the other hand, as a result of the determining step S2901, if the current operational status of each device is not caused by the direct command signal inputted by the user, the smart server controls the determining step S2804 to be executed irrespective of whether the delay time has passed.

Figure 30:
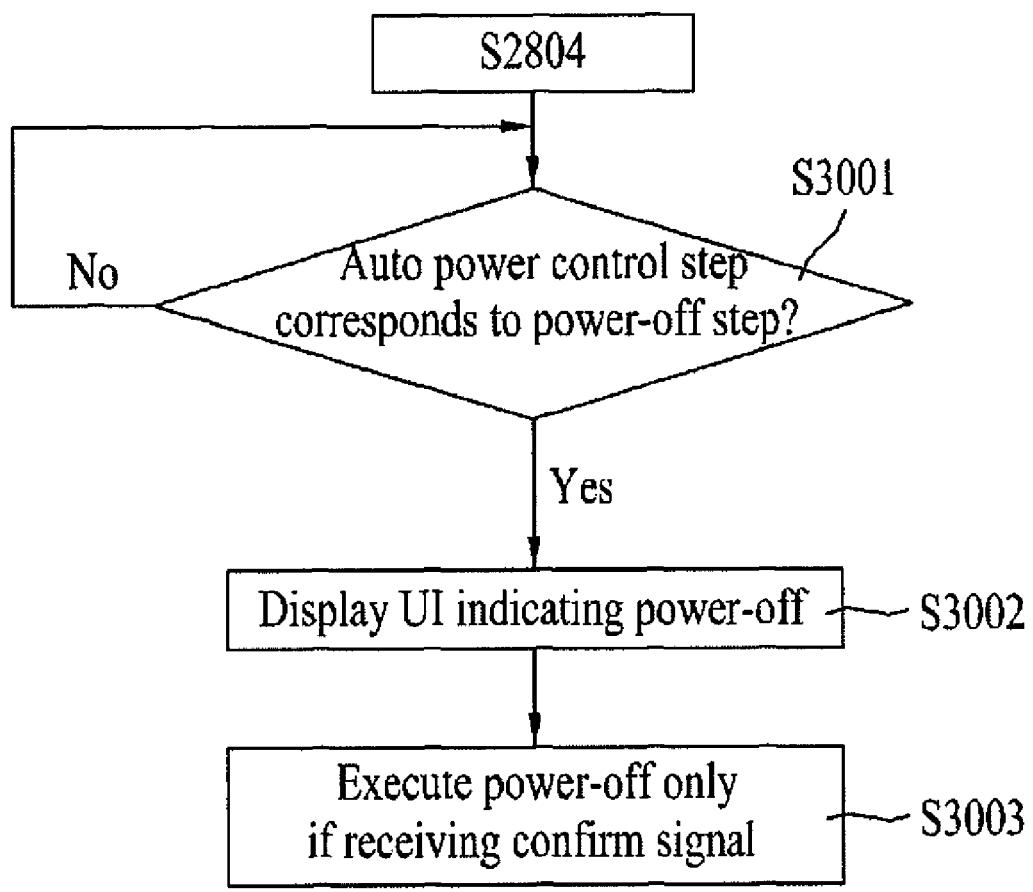
FIG. 30 is a flowchart of another embodiment for implementing step S2805 shown in FIG. 28.

FIG. 30 is a flowchart of another embodiment for implementing step S2805 shown in FIG. 28. In the following description, another embodiment for implementing step S2805 shown in FIG. 28 is explained with reference to FIG. 30.

Referring to FIG. 30, the smart server according to one embodiment of the present invention determines whether the auto power control step S2805 corresponds to a power-off step [S3001].

As a result of the determining step S3001, if the auto power control step S2805 corresponds to the power-off step, the smart server displays a UI indicating that the auto power control step S2805 corresponds to the power-off step [S3002].

Only if a confirmation signal instructing to execute the auto power control (i.e., a control for turning off the corresponding device) is received, the smart server executes the auto power control [S3303].

If the routine is designed in the above manner, the method can prevent an operation of a specific device from being stopped by the smart server. And, the method can prevent each device from being turned on or off while a user is not aware that the corresponding device is being turned on or off.

According to another embodiment of the present invention, the system can be configured so that the smart server can directly execute the ON/OFF auto control. In this case, relevant information can be transmitted to a mobile phone, SGTV or the like prior to executing the ON/OFF auto control. In particular, the relevant information is displayed as a UI form on a screen of the mobile phone or the SGTV. The ON/OFF auto control can be directly executed. Alternatively, the ON/OFF auto control can be controlled only if the relevant information is confirmed through the UI displayed on the mobile phone or the SGTV. Instead of displaying the UI by the smart server, according to another embodiment of the present invention, the UI is transmitted to a smart grid TV, a mobile phone or the like and is then displayed thereon. If so, it is able to raise the user's access possibility.

FIG. 31 is a diagram of power control modes according to a first embodiment of the present invention. In the following description, power control modes according to a first embodiment of the present invention are explained with reference to FIG. 31.

Referring to FIG. 31, auto power control modes can include (a) an ultra saving mode, (b) a sleep mode, and (c) a user-specific mode. Optionally, it is able to further specify a saving mode, a go-out mode, a hold mode, etc. Furthermore, a power control mode including a priority table can be selected.

Referring to FIG. 31, a type and detailed function of a device handled by each of the auto power control modes are variable. Therefore, a user is able to select a mode that is optimized according to a user's preference, habit of device use, importance and situation, etc. Moreover, if a user-specific mode does not exit, the system is configured to specify devices and functions to auto power control targets in detail, as shown in FIG. 31(c). These modes can be available for the user's selection on the screen of the smart server or other devices. Further, the screen can also provide the selected modes for the various appliances.

Therefore, by introducing the concept of the auto power control mode shown in FIG. 31, it is able to meet the needs of various users.

FIG. 32 is a table illustrating an example of delay time according to a first embodiment of the present invention. In the following description, a delay time according to a first embodiment of the present invention is explained with reference to FIG. 32.

As mentioned in the foregoing description, the concept of the delay time is introduced due to the following reasons. First of all, if there is a history that a user has controlled a specific device prior to executing the auto power control, it may be somewhat necessary to hold the execution of the auto power control. For instance, when a guest pays a visit to the user's house, the user can set an airflow of an air conditioner to a max. However, if an auto power control system is activated without considering this special situation, the reliability on the auto power control system is degraded.

Therefore, a delay time, as shown in FIG. 32, can be set for each device. According to another example of the present invention, the delay time is set differently per specific time zone.

For instance, since it is less probable that a refrigerator, a washer, an air conditioner or the like is used at night, a delay time set for night is set smaller than a delay time set for daytime. On the contrary, since it is more probable that an illumination device (e.g., lights) is used at night, a delay time set for daytime is set smaller than a delay time set for night.

According to another embodiment of the present invention, the smart server keeps monitoring a pattern for a user to control each device. As a result of the monitoring, if a user frequently gives control commands to a device-A rather than to other devices, a delay time for the device-A can be set to increase relatively. On the contrary, as a result of the monitoring, if a user barely gives a control command to a device-B rather than to other devices, a delay time for the device-A is set to decrease relatively. If the delay time is designed in the above manner, the user's satisfaction on how the power control operation is managed and executed can be further enhanced.

In particular, the delay time can be periodically updated according to a device type and control history of the corresponding device, whereby a current user can be provided with a further optimized service.

FIG. 33 is a first table of a limit range according to a first embodiment of the present invention. In the following description, a limit range for illumination (e.g., lighting the various rooms) according to a first embodiment of the present invention is explained with reference to FIG. 33. Of course, the numerical values shown in FIG. 33 are examples, by which the present invention is non-limited.

A limit range for each device proposed by one embodiment of the present invention is set such that the user's satisfaction from using the appliance/device is not compromised even if the device is operated within that limit range or specific value within that limit range. As a result, the power consumption can be reduced while satisfying the user's needs.

Referring to FIG. 33, an illuminator (e.g., lights) located at a study room of the user's home or office has a limit range between 300 and 310 lux. Therefore, when the lux of the illuminator located at the study room is currently set to a value between 300 and 310 lux, the lux can be adjusted into a specific value for reducing the power consumption within the range. Because the power control for the illuminator is set to a value within the limit rage, the user is unlikely notice any significant change to the lighting but at the same time, the power consumption by the illuminator can be reduced. In consideration of maximum efficiency of the power consumption, it is possible to adjust the illuminator to be set to 300 lux, which may be used during the peak time or high power rate time.

Referring to FIG. 33, an illuminator located at a kitchen has a limit range between 200 and 210 lux. Therefore, when the lux of the illuminator located at the kitchen is currently set to a value between 200 and 210 lux, if the lux is adjusted into a specific value for reducing the power consumption within the range, the user can save power without compromising the use of the illuminator. In consideration of maximum efficiency of the power consumption, it is possible to adjust the illuminator to be set to 200 lux, which may be used during the peak time or high power rate time.

Referring to FIG. 33, an illuminator located at a living room has a limit range between 100 and 110 lux. Therefore, when the lux of the illuminator located at the living room is currently set to a value between 100 and 110 lux, if the lux is adjusted into a specific value for reducing the power consumption within the range, the user can save power without compromising the use of the illuminator. In consideration of maximum efficiency of the power consumption, it is possible to adjust the illuminator to be set to 100 lux, which may be used during the peak time or high power rate time.

Referring to FIG. 33, an illuminator located at a bathroom has a limit range between 50 and 60 lux. Therefore, when the lux of the illuminator located at the bathroom is currently set to a value between 50 and 60 lux, if the lux is adjusted into a specific value for reducing the power consumption within the range, the user can save power without compromising the use of the illuminator In consideration of maximum efficiency of the power consumption, it is possible to adjust the illuminator to be set to 50 lux, which may be used during the peak time or high power rate time.

Meanwhile, the range of limit values in this disclosure may include the range in which a user does not notice or feel inconvenienced by a change of the setting value. According to another embodiment of the present invention, it is able to additionally define a concept of a second limit value as follows.

First of all, the second limit value corresponds to a value optimized according to the surroundings. In particular, brightness adjustment of LED illuminator at night time can be set differently from that at daytime. Since the daytime is relatively brighter than the night time in general, the LED illuminator for the daytime can be automatically set to 80 lux. Since the night is relatively darker than the daytime in general, the LED illuminator for the night time can be automatically set to 100 lux. As a variation, using weather information, the LED illuminator on a sunny day can be automatically set to 70 lux, whereas the LED illuminator on a cloudy or rainy day can be automatically set to 120 lux. Moreover, an air conditioner in the winter time can be set to operate within a range of 1 degree in case of 1-step adjustment, whereas the air conditioner in the summer time can be set to operate within a range of 2 degrees in case of 1-step adjustment.

FIG. 34 is a second table of a limit range according to a first embodiment of the present invention. In the following description, a limit range for an air conditioner according to a first embodiment of the present invention is explained with reference to FIG. 34. Of course, the numerical values shown in FIG. 34 are examples, by which the present invention is non-limited.

A limit range proposed by one embodiment of the present invention allows the user to still be satisfied by the use of the device even if the operation parameters for the device may have been changed to preset numerical value(s).

Referring to FIG. 34, an air conditioner in the summer daytime has a limit range between 26 and 28° C. Therefore, when the setting temperature of the air conditioner is set to 26 and 28° C., even if the setting temperature of the air conditioner is adjusted into a specific value for reducing the power consumption within this range, the user is unlikely to notice the difference or feel inconvenienced in using the air conditioner. In consideration of maximum efficiency of the power consumption, it is possible to adjust the setting temperature of the air conditioner into 28° C.

Moreover, referring to FIG. 34, the air conditioner in the summer night time has a limit range that is all ranges (e.g., no limit). Therefore, in case of summer nights irrespective of a current setting temperature of the air conditioner, even if the setting temperature of the air conditioner is raised by 1° C. during the auto power control mode, the user is unlikely to notice or feel inconvenienced in using the air conditioner. This is to consider a situation that the summer night is relatively cooler than summer daytime.

FIG. 35 is a third table of a limit range according to a first embodiment of the present invention. In the following description, a limit range for a heater according to a first embodiment of the present invention is explained with reference to FIG. 35. Of course, the numerical values shown in FIG. 35 are examples, by which the present invention is non-limited.

A limit range proposed by one embodiment of the present invention allows the user to still be satisfied by the use of the device even if the operation parameters for the device may have been changed to preset numerical value(s).

Referring to FIG. 35, a heater at the winter night has a limit range between 18 and 20° C. Therefore, when the setting temperature of the heater is set to 18 and 20° C., even if the setting temperature of the heater is adjusted into a specific value for reducing the power consumption within the range, the user is unlikely to notice or feel inconvenienced when using the heater. In consideration of maximum efficiency of the power consumption, it is possible to adjust the setting temperature of the heater into 18° C.

Moreover, referring to FIG. 35, the heater at the winter daytime has a limit range equal to all ranges. Therefore, in case of winter night irrespective of a current setting temperature of the heater, even if the setting temperature of the heater is lowered by 1° C., the user is unlikely to notice of feel inconvenienced by the operation of the heater. This is to consider a situation that the winter daytime is relatively warmer than the winter nights.

Thus, step S2805 enables a function/parameter of each device to be adjusted into a numerical value corresponding to a minimum value for power consumption reduction within the limit range, for example.

Figure 36:
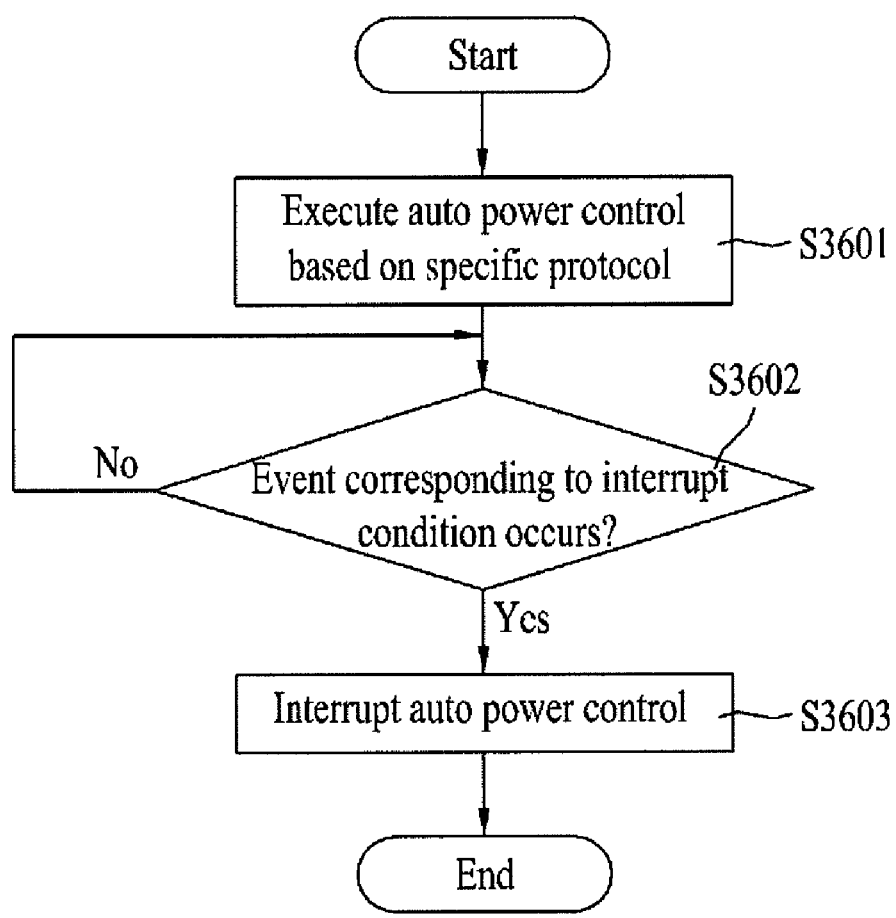
FIG. 36 is a flowchart of a method of controlling a smart server according to a second embodiment of the present invention.

FIG. 36 is a flowchart of a method of controlling a smart server according to a second embodiment of the present invention. In the following description, a method of controlling a smart server according to a second embodiment of the present invention is explained with reference to FIG. 36.

The smart server according to another embodiment of the present invention manages at least one or more devices within home supplied with power. In this case, the devices can include various home appliances (e.g., TV, air conditioner, refrigerator, washer, illumination, etc.) and can include other devices if necessary.

Referring to FIG. 36, the smart server according to an embodiment of the present invention executes an auto power control of at least one or more devices within a home or other location based on a data protocol [S3601].

Subsequently, the smart server determines whether an event corresponding to an interrupt condition for the auto power control execution has occurred [S3602].

As a result of the determining step S3602, if the event has occurred, the smart server is designed to interrupt the auto power control over the device that was the target of the auto power control in step S3601 [S3603].

Meanwhile, the event corresponding to the interrupt condition can correspond to at least one of a direct command signal inputted by a user, a malfunction signal of each or corresponding device and a forcible control signal due to a demand response (DR), for example.

Moreover, for example, step S3601 can be performed in a manner of transceiving at least one of current status information on a function of each device added to the data protocol using small-power wireless communication and group information on the group, on which the auto power control is simultaneously performed, with the device. Besides, the data protocol can correspond to Zigbee communication protocol for example. This is explained in detail with reference to FIG. 37 as follows.

FIG. 37 is a table of an added Zigbee communication protocol according to a second embodiment of the present invention. In the following description, an added Zigbee communication protocol, as an example only, according to a second embodiment of the present invention is explained with reference to FIG. 37.

Referring to FIG. 37, according to one embodiment of the present invention, a field related to device status monitoring and a field related to group are added to a cluster name. Although the addition is performed on the cluster name in FIG. 37, fields newly defined according to one embodiment of the present invention can be added to a private field or a reserved field.

The field related to the device status monitoring defines a current status of all functions of each device located at home (or any applicable location). For instance, this field includes very specific information such as a setting temperature of air conditioner, lux of illuminator, volume of TV and the like.

And, the field related to the group defines a group of devices that are simultaneously controlled by the smart server. For instance, the group can be determined by a region unit (e.g., room 1, room 2, room 3, etc.) or can be determined by a unit of a plurality of users (e.g., father, mother, son, daughter, etc.). Therefore, since the on/off control of the devices bundled into the same group is performed once or simultaneously, to the invention enhances the data processing speed and efficiency of the auto power control system.

Figure 38:
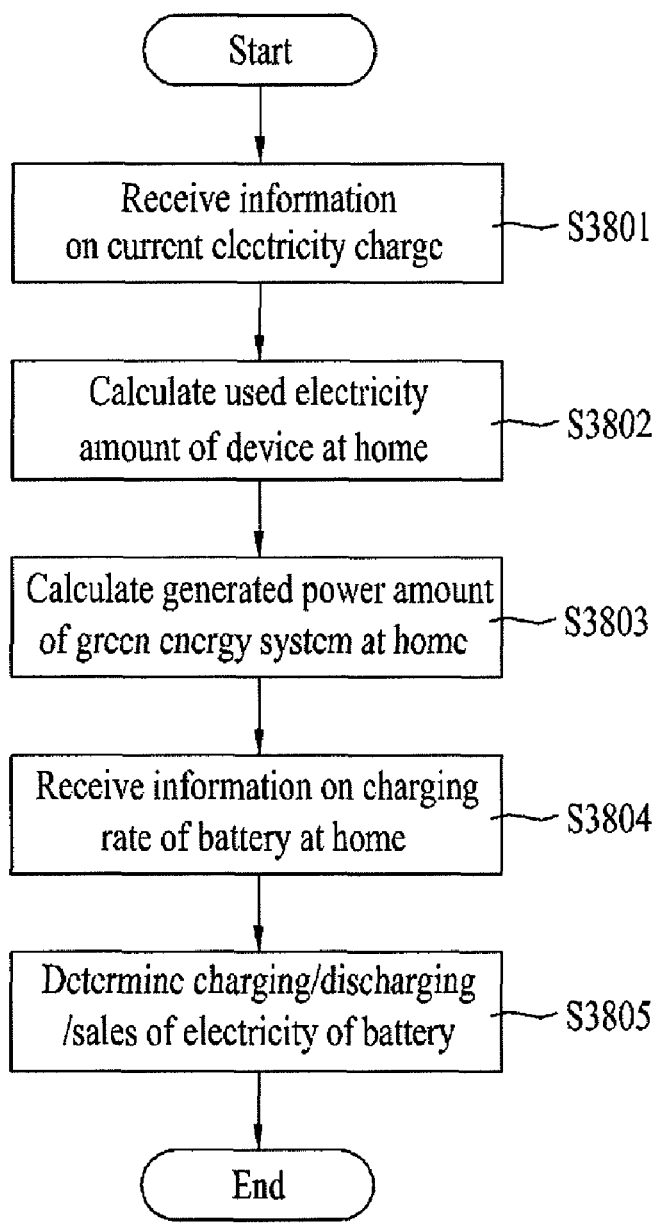
FIG. 38 is a flowchart of a method of controlling a smart server according to a third embodiment of the present invention.

FIG. 38 is a flowchart of a method of controlling a smart server according to a third embodiment of the present invention. In the following description, a method of controlling a smart server according to a third embodiment of the present invention is explained with reference to FIG. 38.

The smart server according to another embodiment of the present invention manages at least one or more devices within a home supplied with power. In this case, the devices can include various home appliances (e.g., TV, air conditioner, refrigerator, washer, illumination, etc.) and can include other devices if necessary.

Referring to FIG. 38, the smart server according to an embodiment of the present invention receives information on a current electricity charge [S3801]. The current electricity charge can be information on how much a unit of electricity/power is currently for a certain future time, or for a current time. As a variation, step S3801 can periodically receive the information of the electricity charge from a power supply source (TOC), an EMC or the like. Here, the information of the electricity charge can be broadly referred to as power information (e.g., power rate information).

The smart server calculates an amount of electricity used by at least one device at home [S3802]. Optionally, step S3802 can be performed by providing the information on the amount of electricity used electricity from each device by real time or periodically.

The smart server calculates an amount of power generated by a green energy system (or other system) installed at home [S3803]. In this case, the green energy system can include, e.g., a power generating system installed at home as a photovoltaic power generating system, a small-scale wind power generating system and the like. Optionally, step S3803 can be performed by receiving information on the amount of power generated from the green energy system by real time or periodically.

The smart server receives information on a charging rate of a battery installed at home [S3804]. Optionally, step S3804 can be performed by receiving information on the charging rate (e.g., % unit) from the battery (for using the battery associated with the home or the device) by real time or periodically.

Based on at least one of the information on the electricity charges, the used electricity amount, the generated power amount and the information on the battery charging rate, the smart server is able to control a charging, discharging or sales of the electricity with which the battery is charged [S3805].

Meanwhile, the controlling step S3805 is explained in detail as follows.

First of all, according to one embodiment, the smart server controls a charging, discharging or sales of the electricity/power in the battery according to a first condition about whether the information on the electricity charge is equal to or greater than a reference value, a second condition about a comparison between the used electricity amount and the generated electricity amount, and a third condition about whether the information of the charging rate is equal to or greater than a reference value.

Secondly, according to another embodiment, the smart server controls a charging with the electricity stored in the battery if the first condition indicates that the information on the electricity charge is smaller than the reference value, the second condition indicates that the generated electricity amount is equal to or greater than the used electricity amount, and the third condition indicates that the charging rate is smaller than the reference value.

Thirdly, according to a further embodiment, the smart server controls the electricity stored in the battery to be discharged or sold if the second condition indicates that the generated electricity amount is equal to or greater than the used electricity amount and the third condition indicates that the charging rate is equal to or greater than the reference value.

This is explained in detail with reference to FIG. 39 using examples of detailed numerical values.

FIG. 39 is a diagram of an example of a table which can be used for operating a smart server according to a third embodiment of the present invention. In the following description, a table for operating a smart server according to a third embodiment of the present invention is explained with reference to FIG. 39.

Referring to FIG. 39, a first condition about whether the information on the electricity charge is equal to or greater than a reference value (e.g., 95 Korean Won/kW), a second condition about matters between the used electricity amount and the generated electricity amount, and a third condition about whether the information of the charging rate is equal to or greater than a reference value (e.g., 60%) are used. Of course, an embodiment of the invention is able to consider that the numerical values shown in FIG. 39 are adjustable within a reasonable range.

If the information on the electricity charge is smaller than the reference value in the first condition, the generated electricity amount (e.g., from the power company) is equal to or greater than the used electricity amount in the second condition, and the information of the charging rate is smaller than the reference value in the third condition, then the smart server according to an embodiment of the present invention controls the battery located at home to be charged with the charging electricity.

If the generated electricity amount is equal to or greater than the used electricity amount in the second condition and the information of the charging rate is equal to or greater than the reference value in the third condition (irrespective of the first condition), the smart server according to an embodiment of the present invention controls the charging electricity stored in the battery located at home to be discharged or sold (e.g., the battery stored at home may be sold to another party/home). In this case, since the electricity generated from the green energy system at home or the charging electricity stored in the battery is sufficient, the sales of the electricity preferably means that the electricity is re-sold to another home. According to this configuration, the invention provides advantages to both an electricity seller and an electricity buyer. And, the electricity is efficiently managed. Therefore, the invention is further advantageous to TOC and the country.

Moreover, the system can be configured to discharge the battery unless the above-described two cases are applicable.

According to one embodiment, the present invention can configure the aforesaid functions of the smart server to be implemented in a smart grid TV or a mobile phone. For instance, data handled by the smart server can designed to be transmitted to the smart grid TV, the mobile phone or the like entirely or in part. Alternatively, functions of the smart server can be designed to be loaded on the smart grid TV, the mobile phone or the like entirely or in part.

Figure 40:
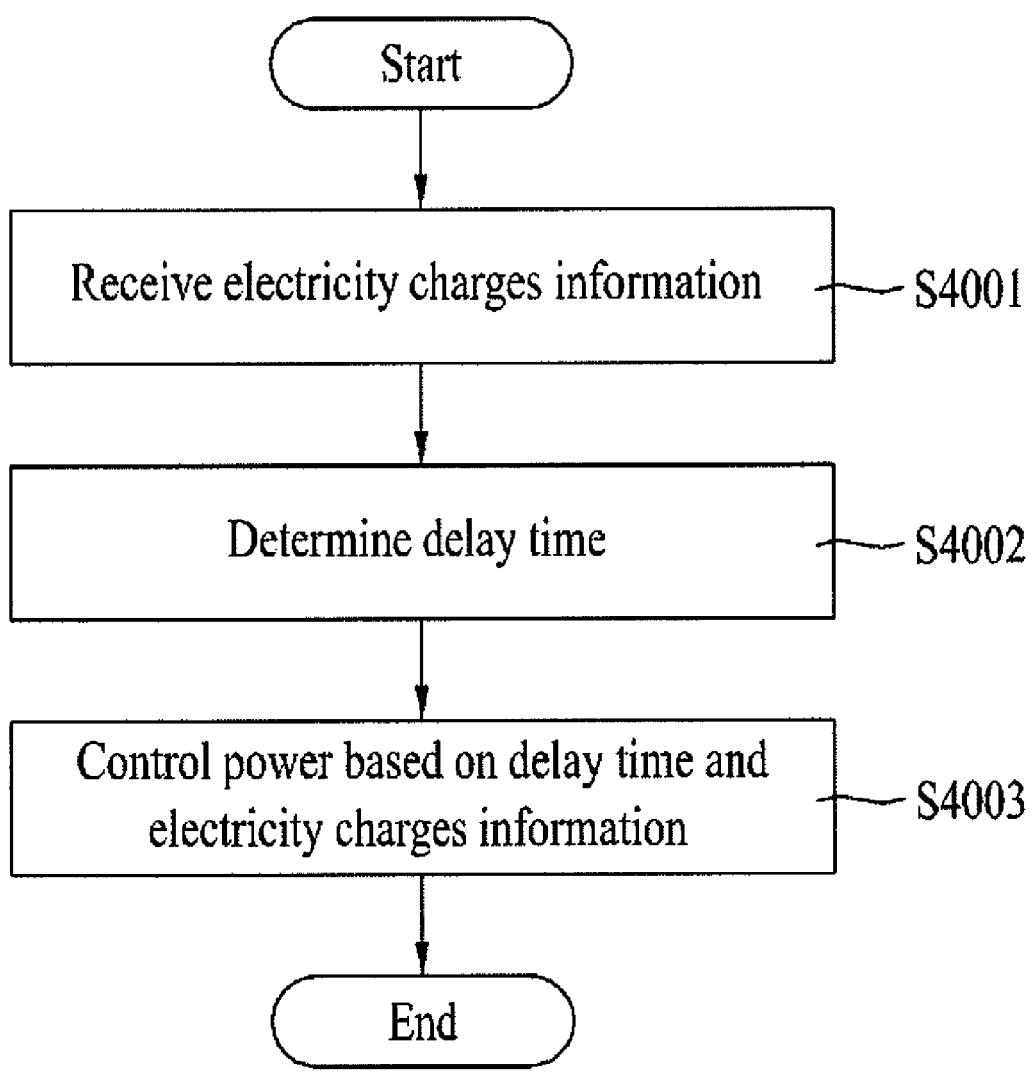
FIG. 40 is a flowchart of a method of controlling a smart server according to a fourth embodiment of the present invention.

FIG. 40 is a flowchart of a method of controlling a smart server according to a fourth embodiment of the present invention. In the following description, a method of controlling a smart server according to a fourth embodiment of the present invention is explained with reference to FIG. 40.

Referring to FIG. 40, the smart server receives power information such as electricity charge information [S4001]. For instance, the smart server is able to receive the electricity charge information (e.g., information on the amount of fee per unit of electricity, which is charged to a consumer according to the amount of the electricity is used) from a TOC or EMC. Moreover, step S4001 can be performed by receiving the electricity charge information via an IP (internet protocol) network or a PLC (power line communication) network.

According to a presence or non-presence of a user's manual manipulation of a specific device or appliance, the smart server determines a delay time to be taken before the auto control mode entry of the smart server for the specific device [S4002]. In this case, the delay time can be manually set by the user or can be determined automatically in a following manner.

Step S4002 can further include the step of enabling the smart server to adjust the delay time according to an external environment of the device. This adjusting step can further include the step of deleting (or omitting) the delay time, (a) if the electricity charge information corresponds to a peak time interval (e.g., the delay time may not be provided so that the appliance can enter the automatic power control mode sooner when the electricity charge information indicates that the upcoming times are peak times where high electricity rates are charged), or (b) if the electricity charge information indicates that the use of the electricity will be charged to a rate equal to or greater than a preset charge (e.g., the preset charge can be determined by a user set within a specific range according to the user's affordability or preference), or (c) if the electricity charge information indicates that the electricity rate is or will be increased over a predetermined range in comparison with the former or previously-charged electricity rate obtainable from the previously received electricity rate information (e.g., electricity charges are raised rapidly or over 30%). In this case, 'deleting the delay time' can include a case that the delay time is forced to be set to 0 or to a minimum value. And, the adjusting step can include the step of displaying an alarm message indicating that the power control of the specific device is being performed by the smart server.

Based on the delay time and the electricity charge information, the smart server controls the power of the specific device [S4003]. Step S4003 can further include the steps of storing a power control history of the specific device by the smart server in a memory (e.g., database, etc.) and displaying the stored power control history if a request for an access to the memory is made. In case of implementing the memory-storing and accessing steps, the invention prevents the auto power control from being misunderstood as a failure by the user.

As a variation, the step of selecting a power control mode including a priority table configured to identify a type of each device as a power control target and a function of the corresponding device can be further included in the method of FIG. 40. In this regard, since the priority table and the power control mode are sufficiently explained in the above descriptions with reference to the corresponding drawings, the same explanation is omitted herein for the sake of brevity.

Figure 41:
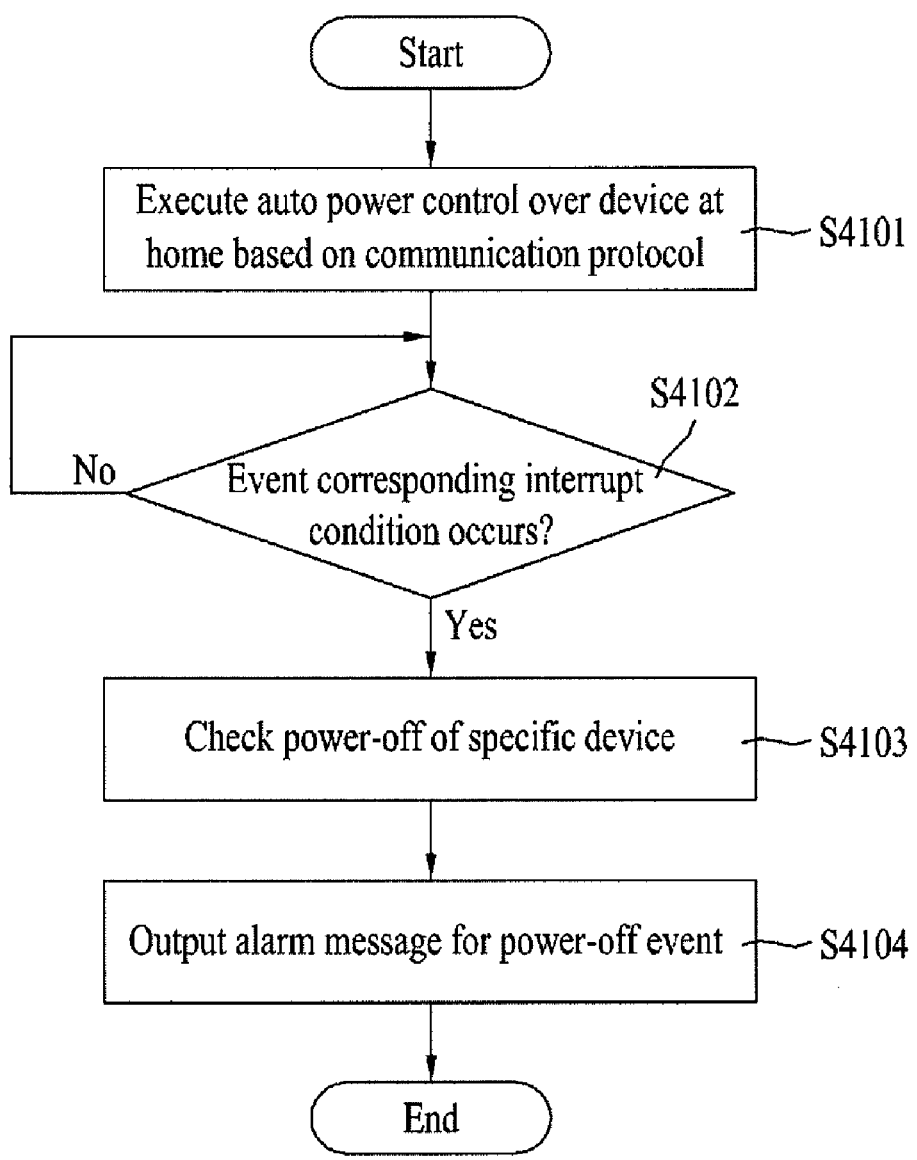
FIG. 41 is a flowchart of a method of controlling a smart server according to a fifth embodiment of the present invention.

FIG. 41 is a flowchart of a method of controlling a smart server according to a fifth embodiment of the present invention. In the following description, a method of controlling a smart server according to a fifth embodiment of the present invention is explained with reference to FIG. 41.

Referring to FIG. 41, the smart server executes an auto power control over at least one device at a home based on a communication protocol [S4101]. Subsequently, the smart server determines whether an event corresponding to an interrupt condition of the auto power control has occurred [S4102]. As a result of the determining step S4102, if for example a power-off event (interrupt condition) of a specific device occurs, the smart server checks whether or not the power of the specific device is turned off [S4103]. The smart server then outputs an alarm message/indication indicating the power-off event of the specific device has occurred [S4104].

In this case, the alarm message can include at least one of a type of the device, an occurring hour of the power-off and a cause of the power-off event. And, the power-off event can be caused by a DR (demand response) of the power supply source or the power service center. Meanwhile, the power supply source can correspond to the aforesaid TOC and the power service center can correspond to the aforesaid EMC.

And, step S4104 can include at least one of the step of displaying the alarm message about the power-off event of the specific device on a screen of the smart server and the step of transmitting the alarm message to a smart grid TV or a mobile phone.

Moreover, step S4101 is executed according to at least one of first field information for identifying a current status of a function of each device added to Zigbee protocol, and second field information for identifying a group on which the auto power control is simultaneously performed. The first field information and the second field information can correspond to a field having the cluster name shown in FIG. 37 set to 'device status monitoring' and a field having the cluster name shown in FIG. 37 set to 'group', respectively.

Figure 42:
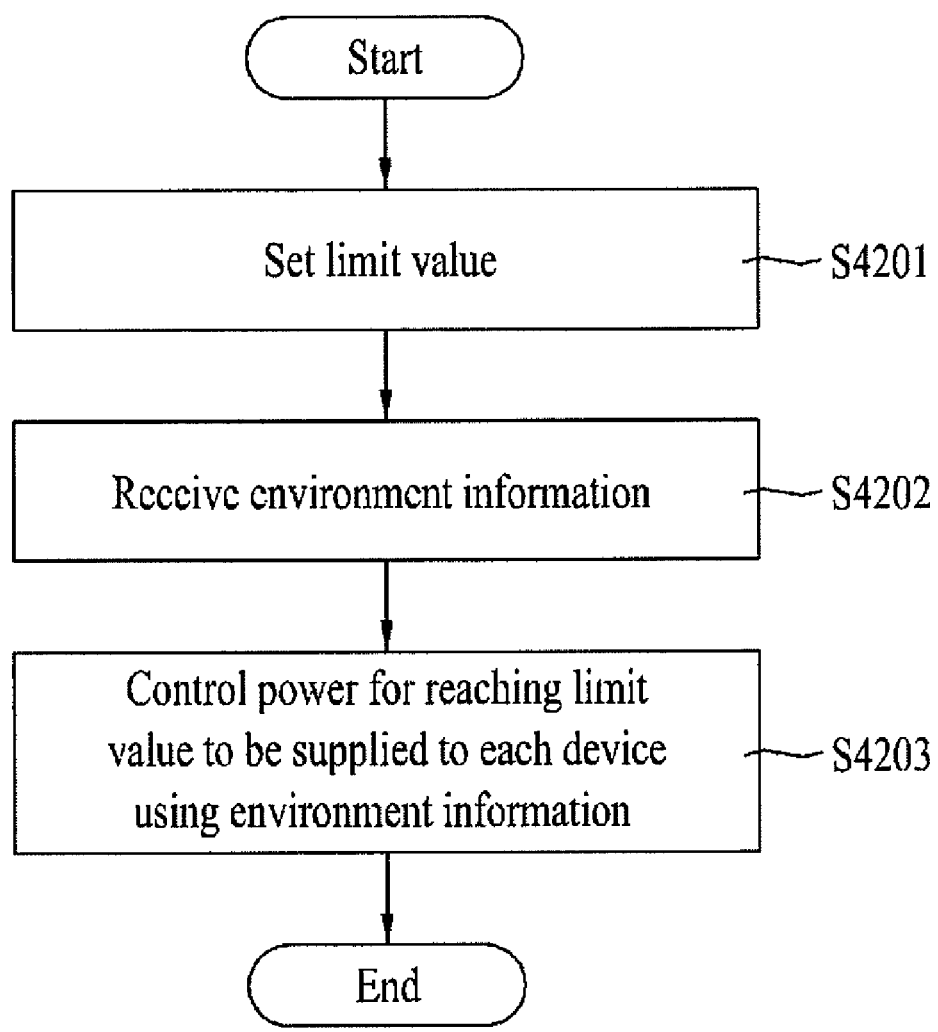
FIG. 42 is a flowchart of a method of controlling a smart server according to a sixth embodiment of the present invention.

FIG. 42 is a flowchart of a method of controlling a smart server according to a sixth embodiment of the present invention. In the following description, a method of controlling a smart server according to a sixth embodiment of the present invention is explained with reference to FIG. 42.

Referring to FIG. 42, the smart server sets a limit value per function of each device [S4201]. In this case, the limit value described with reference to FIG. 42 corresponds to the aforesaid second limit value.

The smart server receives environment information on a peripheral/external environment in which each device is located [S4202]. The smart server controls power for reaching a per-function limit value of the device (where this power is to be supplied to the corresponding device) using the received environment information on the peripheral environment [S4203].

In this case, the environment information on the peripheral environment includes at least one of current hour information, current date information, current weather information and information on a space at which each device is located, for example.

Therefore, step S4203 can further include the step of calculating a control time taken for the environment information on the peripheral environment to reach the per-function limit value and the step of controlling the power to be supplied to the corresponding device. For instance, when the limit value is set to 18° C., if a current temperature identified in the environment information directed to the peripheral environment of the device is confirmed as 20° C., the smart server is configured to calculate an amount of power (e.g., a power control time) needed to lower the current temperature 20° C. of the device down to the limit value 18° C. and to perform the auto power control according to the calculated power amount (e.g., power control time).

Meanwhile, the above-described smart server can consider a case of establishing a separate server at home. Alternatively, the smart server can be configured as a module, which is responsible for the same functions of the smart server, to be loaded in a smart grid TV or a mobile phone.

Figure 43:
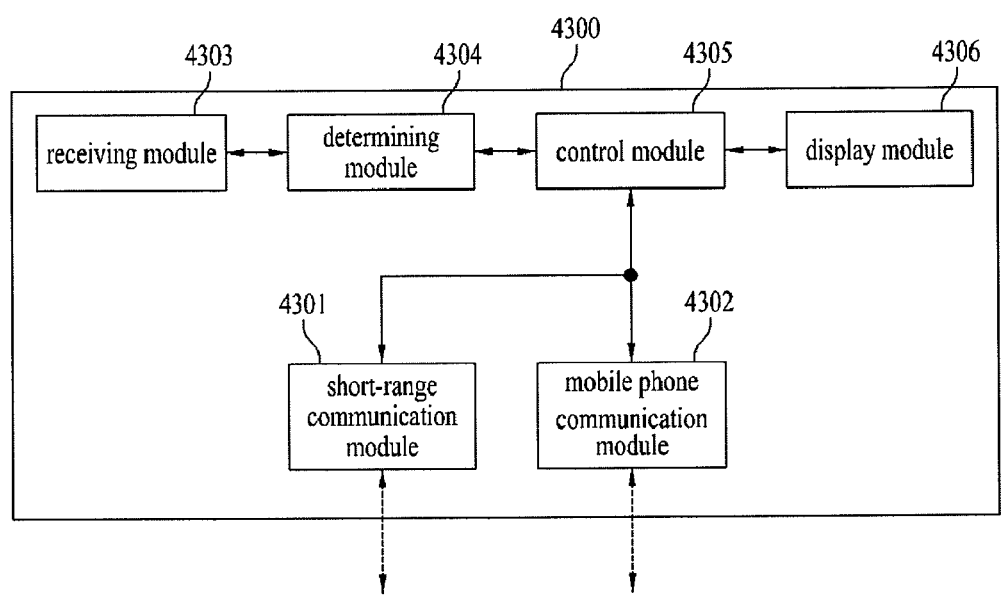
FIG. 43 is a block diagram of an example of modules of the smart server for implementing the method shown in FIG. 40.

FIG. 43 is a block diagram of an example of modules of the smart server for implementing the method shown in FIG. 40. All components of the smart server are operatively coupled and configured.

Referring to FIG. 43, a smart server 4300 includes a receiving module 4303, a determining module 4304, a control module 4305, a short-range communication module 4301, a mobile phone communication module 4302, a display module 4306 and the like for example. This is just one example, by which the scope of the appended claims and their equivalents is non-limited.

The short-range communication module 4301 is the module configured to perform data communication with each device installed at home. And, Zigbee, Wi-Fi, Bluetooth, mesh RF technology, binary CDMA or the like can be provided by the short-range communication module 4301 for example.

The mobile phone communication module 4302 is the module configured to perform communication with a mobile phone. And, CDMA (code division multiple access), W-CDMA (wideband-code division multiple access), GSM (global system for mobile communication) or the like can be implemented by the mobile phone communication module 4302 for example.

The receiving module 4303 receives the power information such as the electricity charge information. And, the determining module 4304 determines a delay time to be taken until the auto control mode entry of the smart server for a specific device according to a presence or non-presence of a user's manipulation of the specific device. Moreover, the control module 4305 controls power supplied to the specific device based on the delay time and the electricity charge information.

The determining module 4304 is able to adjust the delay time according to a peripheral environment of the device by the smart server. And, the display module 4306 displays an alarm message indicating that the power control of the specific device is going to proceed by the smart server.

After the delay time has passed, the control module 4305 controls the power of the specific device using the electricity charge information.

In case that the control module 4305 has controlled a power control history of the specific device by the smart server to be stored in a memory, the display module 4306 displays the power control history stored in the memory each time an access to the memory is requested.

The receiving module 4303 receives the electricity charge information via the IP network or the PLC network.

And, the display module 4306 displays a power control mode including a priority table configured to identify a type of each device as a power control target and a function of the corresponding device.

Figure 44:
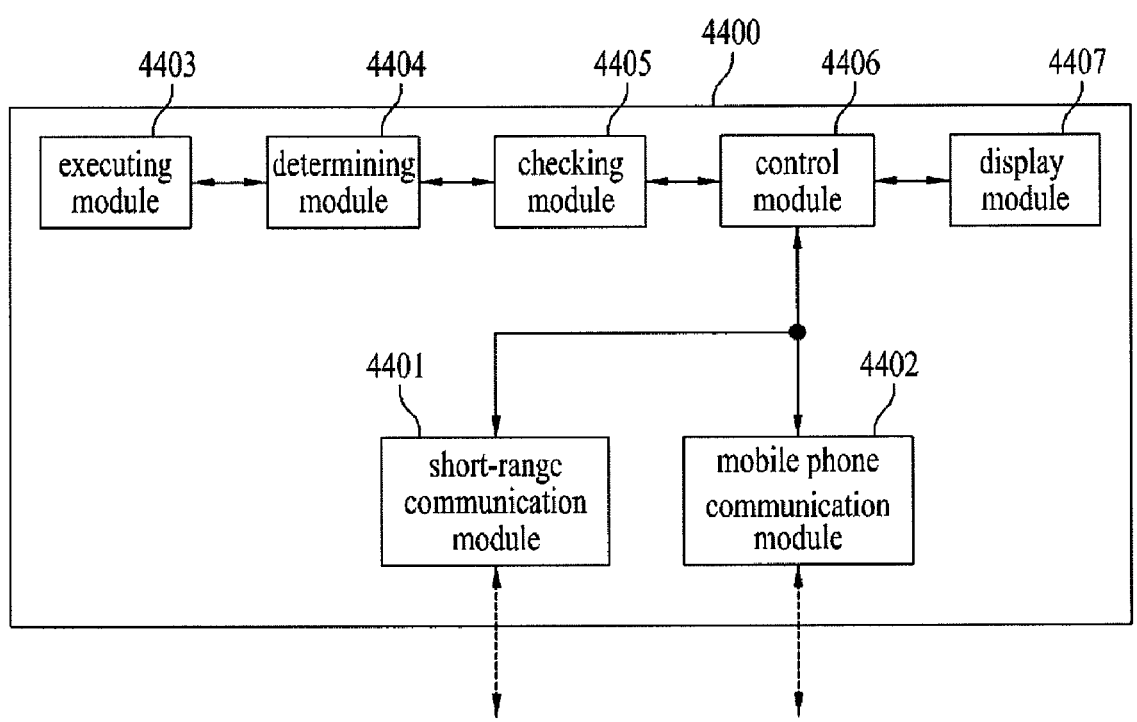
FIG. 44 is a block diagram of an example of modules of the smart server for implementing the method shown in FIG. 41.

FIG. 44 is a block diagram of an example of modules of the smart server for implementing the method shown in FIG. 41. All components of the smart server are operatively coupled and configured.

Referring to FIG. 44, a smart server 4400 includes an executing module 4403, a determining module 4404, a checking module 4405, a control module 4406, a short-range communication module 4401, a mobile phone communication module 4402, a display module 4407 and the like for example. This is just one example, by which the scope of the appended claims and their equivalents is non-limited.

The short-range communication module 4401 is the module configured to perform data communication with each device installed at home. And, Zigbee, Wi-Fi, Bluetooth, mesh RF technology, binary CDMA or the like can be provided by the short-range communication module 4401 for example.

The mobile phone communication module 4402 is the module configured to perform communication with a mobile phone. And, CDMA (code division multiple access), W-CDMA (wideband-code division multiple access), GSM (global system for mobile communication) or the like can be implemented by the mobile phone communication module 4402 for example.

The executing module 4403 executes an auto power control over at least one device at home based on a communication protocol. And, the determining module 4404 determines whether an event corresponding to the interrupt condition of the auto power control has occurred.

In case that a power-off event of a specific device has occurred, the checking module 4405 confirms that the power of the specific device is turned off. The control module 406 controls an alarm message indicating the power-off event of the specific device to be output.

The control module 4406 controls the alarm message to be displayed via the display module 4407 or controls the alarm message to be transmitted to a smart grid TV or a mobile phone using the short-range communication module 4401 or the mobile phone communication module 4402.

The executing module 4403 is executed according to at least one of first field information for identifying a current status of a function of each device added to Zigbee protocol, and second field information for identifying a group on which the auto power control is simultaneously performed.

In this case, the alarm message can include at least one of a type of the device, an occurring hour of the power-off and a cause of the power-off event. And, the power-off event can be caused by a DR (demand response) of a power supply source or a power service center.

Figure 45:
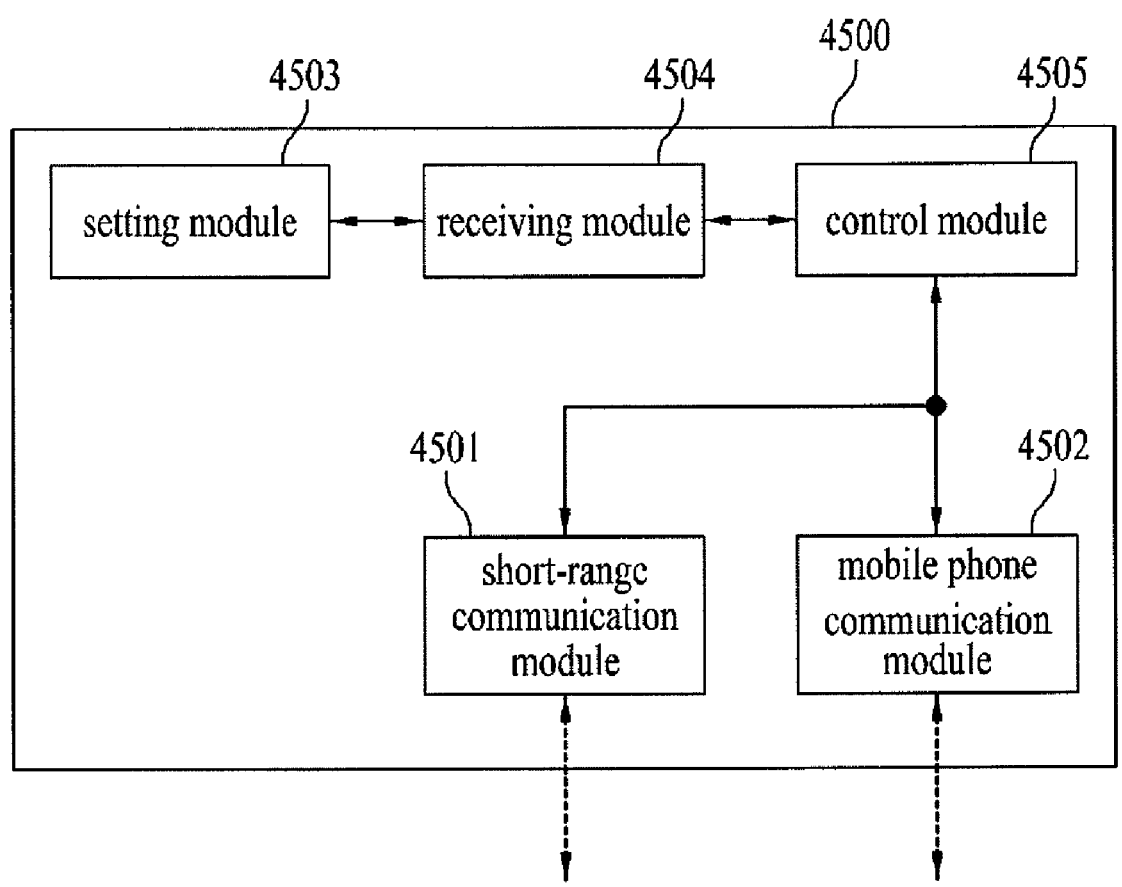
FIG. 45 is a block diagram of an example of modules of the smart server for implementing the method shown in FIG. 42.

FIG. 45 is a block diagram of an example of modules of the smart server for implementing the method shown in FIG. 42. All components of the smart server are operatively coupled and configured.

Referring to FIG. 45, a smart server 4500 includes a setting module 4503, a receiving module 4504, a control module 4505, a short-range communication module 4501, a mobile phone communication module 4502 and the like for example. This is just one example, by which the scope of the appended claims and their equivalents is non-limited.

The short-range communication module 4501 is the module configured to perform data communication with each device installed at home. And, Zigbee, Wi-Fi, Bluetooth, mesh RF technology, binary CDMA or the like can be implemented by the short-range communication module 4501 for example.

The mobile phone communication module 4502 is the module configured to perform communication with a mobile phone. And, CDMA (code division multiple access), W-CDMA (wideband-code division multiple access), GSM (global system for mobile communication) or the like can be implemented by the mobile phone communication module 4502 for example.

The setting module 4503 sets a per-function limit value of each device. And, the receiving module 4504 receives environment information on a peripheral/external environment at which each device is located. Moreover, the control module 4505 controls power that needs to be supplied to the corresponding device in order for the device to reach a per-function limit value of the device using the received environment information on the peripheral environment of the device.

In this case, the environment information of the device/appliance includes at least one of current hour information, current date information, current weather information, and information on a space at which each device is located, for example.

Further, the control unit 4505 calculates a control time needed for certain value(s) in the environment information of the device to reach the per-function limit value and then controls the power to be supplied to the corresponding device during the calculated control time.

Figure 46:
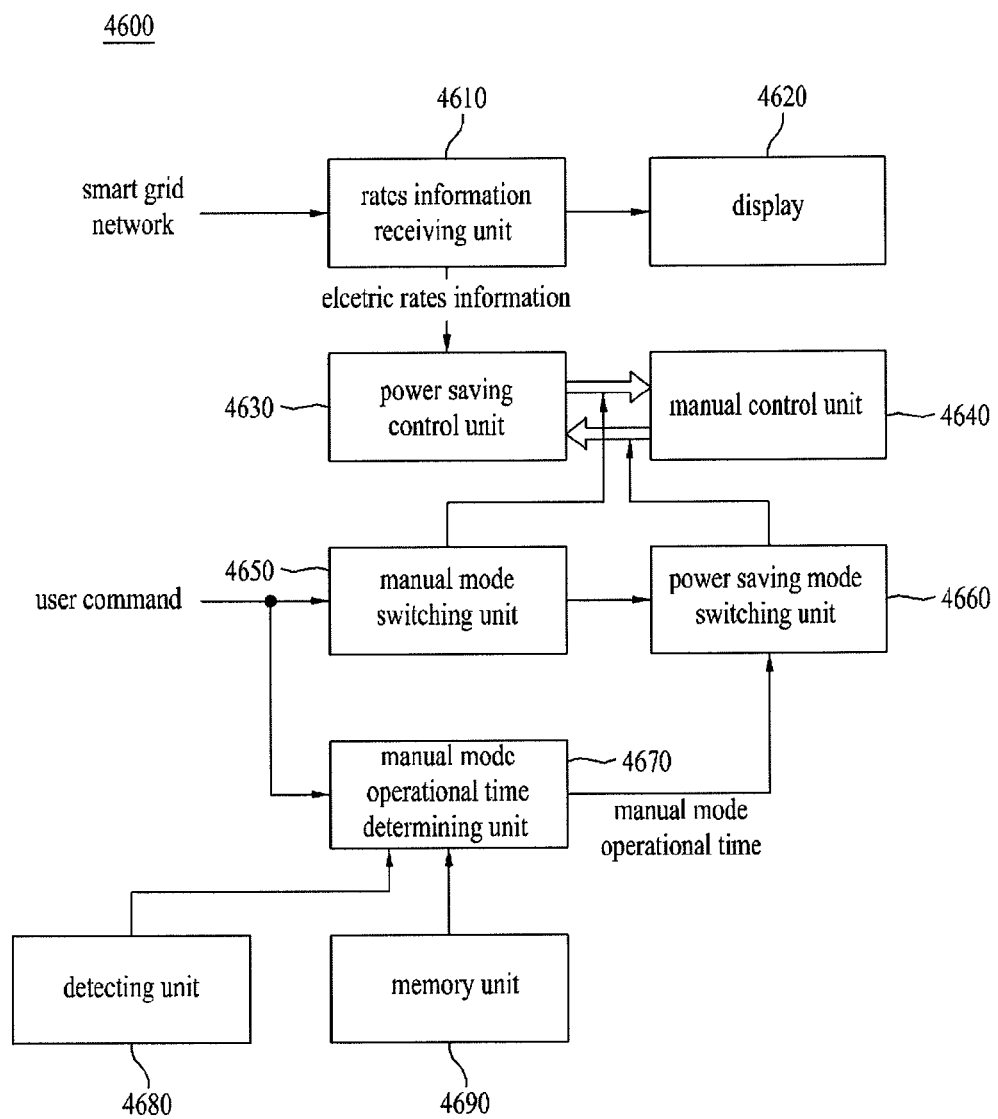
FIG. 46 is a diagram of configuration for a smart device according to a seventh embodiment of the present invention.
Figure 47:
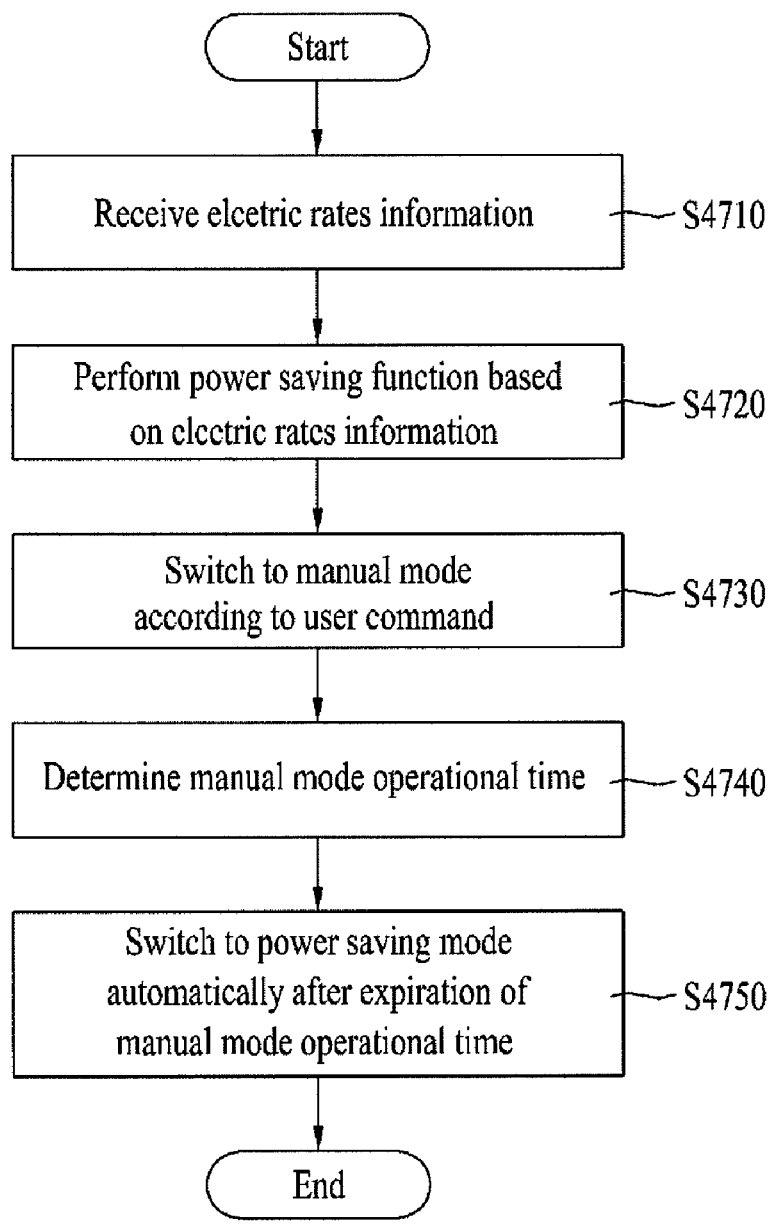
FIG. 47 is a flowchart of a method of controlling a power of a smart device according to a seventh embodiment of the present invention.

FIG. 46 is a diagram of configuration for a smart device according to a seventh embodiment of the present invention, and FIG. 47 is a flowchart of a method of controlling a power of a smart device according to a seventh embodiment of the present invention. In the following description, the components of a smart device 4600 and a power controlling method performed by the smart device according to a seventh embodiment of the present invention are explained with reference to FIG. 46 and FIG. 47. All components of the smart device 4600 are operatively coupled and configured.

Referring to FIG. 46 and FIG. 47, the smart device 4600 is connected to a smart grid network and can be implemented by being built in one body of such a device as a home appliance, an office appliance, a device that utilizes power, and the like. So the smart device 4600 can be part of the target appliance/device that the smart device 4600 intends to control to save power consumption, or can be a separate device connected to the target appliance/device. Functions similar to those performed by the smart device 4600 can be performed by a smart server. The smart device 4600 in this example is a device that is not a server, but can be a smart server.

The smart device 4600 includes a rates information receiving unit 4610, a power saving control unit 4630, a manual control unit 4640, a manual mode switching unit 4650, a power saving mode switching unit 4660 and a manual mode operational time determining unit 4670 (hereinafter named a determining unit 4670), and can further include a display 4620, a detecting unit 4680 and a memory unit 4690. The smart device can further include an input unit for receiving a user input, an output unit (e.g., speaker) for outputting information, a communication unit for communicating with other devices, appliances, server(s), network entities, etc. The display 4620 (or any other display mentioned in the present specification) can include a touch panel for receiving user inputs. Further, the manual mode switching unit 4650 and the power saving mode switching unit 4660 can be part of one unit.

The rates information receiving unit 4610 is connected to a smart grid network and receives power rate information such as electric rate information from the smart grid (e.g., via a smart server, a center, etc.) [S4710]. The power rate information (also can be referred to as power information) includes information on the amount of money/fee charged to a user of power according to a unit of power/electricity used, but can also include other information not directly related to the power rates (e.g., status of the electricity supply at the supplier's location, promotional information, advertisement, update information for the smart device, etc.). The power rate information can vary depending on the demands in the market, time of day, season or month of year, user's use habits, home/office location, state regulations, etc. The rates information receiving unit 4610 can receive the power rate information periodically, as needed, in real time, etc. As mentioned in the foregoing description, the smart grid network can include an interne protocol network, a power line communication or the like, by which the present invention is non-limited. As mentioned in the foregoing description, the power rate information can preferably include electric rates per time zone and can further include reference rate information. In this case, the reference rate information is the reference for determining whether the electric rate on a specific time zone is expensive or not. The reference rate information is set in the smart device. For example, the reference rate information will be set in the smart device by a user, according to auto setting of previous history, or by default. Alternatively, the reference rate information can be received from the smart grid network via the power rate information.

The display 4620 is a device configured to enable a user to check the power rate information received via the rates information receiving unit 4610. Of course, the reference rate information can be further included in the received power rate information. Thus, the user is able to check whether a current electric rate is expensive or not before inputting a manual command. Therefore, the system raises the reliability in handling the user's manual command prior to entering the auto power control mode.

Until a separate command is inputted to the smart device 4600, the smart device 4600 enables the power saving control unit 4630 to perform the power saving function/mode. The power saving control unit 4630 performs the power saving function based on the power rate information [S4720]. In this case, the power saving function is one or more operations performed in the auto control mode (or the auto power control mode) to reduce power consumption by the target device/appliance, which has been discussed above. For instance, in a case that a current electric rate lies in a relatively expensive interval (e.g., peak time period), the power saving mode is the function of minimizing power consumption by the appliance, and the smart device 4600 controls the operations of the target appliance/device) in the auto power control mode (e.g., see FIGS. 27 and 28) so that the power consumption by the target device is reduced to conserve energy and reduce charges billed to the user without providing significant inconvenience to the user.

Unlike the power saving control unit 4630, the manual control unit 4640 controls the power of the smart device irrespective of the power rate information. For instance, if a user command for a manual manipulation is inputted, the manual control unit 4640 can be activated. In this case, the user command is the command for the user to manipulate the smart device 4600 manually. For instance, the user command can include one of a command for raising an output of an air conditioner up to a highest level, a command for lowering a preferred temperature of a refrigerator down to a low level, and the like. Of course, the user command can include a time-limited command for specifying a time for operation in the manual mode or a time-unlimited command for not specifying a time for operation in the manual mode. Specifically, the smart device according to the seventh embodiment of the present invention is effective in case that the user command is the time-unlimited command, by which the present invention is non-limited.

An input unit or a communication unit associated with or included in the smart device 4600 can receive a user command. The input unit can include a button key, a touchpad or the like. And, the communication unit is configured to receive a user command from an external device if the smart device is remote-controllable. The communication unit can receive the user command via the Internet protocol network, Zigbee, Bluetooth, mobile communication data network (e.g., W-CDMA (wideband code division multiple access) or the like, by which the present invention is non-limited.

In case that the user command is inputted by the input unit, the manual mode switching unit 4650 switches from the power saving mode to a manual mode [S4730]. In particular, the power saving control unit 4630 is deactivated while the manual control unit 4640 is activated. As mentioned in the foregoing description, if a user command for a manual manipulation is inputted, although the power saving mode (power saving function) is in progress, the manual mode is entered and the target device is controlled to be in the manual mode. Therefore, the smart device can operate in a user-specific mode irrespective of whether the electric rate are expensive. For instance, the user or system or other condition can override the mode of the target device/appliance, e.g., even though the target device/appliance should operate in the auto power control mode, the user can override it and operate the target device/appliance in the manual mode where the user can set the operational parameters of the target device/appliance. In such a case, the user may be notified of the high rates or other risks involved in operating the target device/appliance in the manual mode.

The detecting unit 4680 includes a module configured to detect an external environment condition including, but not limited to, at least one of an external temperature of the smart device, an external humidity of the smart device, a current date and a current location. The detecting unit 4680 can include at least one of a temperature detecting sensor configured to detect a current external temperature of the target device/appliance, a humidity detecting sensor configured to detect a current external humidity of the target device/appliance, a timer configured to detect a current hour and date, and a GPS module configured to recognize a current location of the target device/appliance. As a variation, such environment information can be obtained or received from another source.

In case that the manual control unit 4640 is activated according to a user command, the manual mode operational time determining unit 4670 determines a manual mode operational time in which the manual control unit 4640 can operate. In this case, the manual mode operational time can be the duration between a start and end of the activation of the manual control unit 4640 right before an activation of the power saving control unit 4630. The smart device is able to determine the manual mode operational time based on at least one of 1) user command, 2) external environment, 3) use history, 4) external command (power service provider), etc. The manual mode operational time can also include the delay time mentioned in the above, see for example FIGS. 29 and 40. The process of determining the manual mode operational time by the smart device based on one or more factors is now described.

First of all, the manual mode operational time determination on the basis of the user command is performed with reference to a relation between a target status corresponding to the user command and a reference status of the smart device. For instance, when a user inputs a user command to enable an output of an air conditioner (target device) to be set to $5^{th}$ step of total 5 steps, if a reference status is set to $2^{nd}$ step of the total 5 steps, it means that a relatively high output is requested. Therefore, the smart device is able to determine a manual mode operational time for the air conditioner is to be set relatively longer. On the contrary, when an output of the air conditioner is set to $3^{rd}$ step of total 5 steps, it is determined that a user requests a low output. Therefore, the smart device can set the manual mode operational time to be shorter, whereby the power saving mode can be entered more quickly or sooner than later. The reference status can be varied by the user or system.

Secondly, the manual mode operational time determination on the basis of the external environment is performed with reference to whether a target status corresponding to a user command is higher than an external environment of the target device. For instance, when a user inputs a user command to enable an output of the air conditioner (target device) to be set to $5^{th}$ step of total 5 steps, if the external temperature is 35 degrees, a manual mode operational time is set relatively longer. If the external temperature is 25 degrees, the manual mode operational time is set shorter. Therefore, the power saving mode can be entered more quickly or sooner than later.

Thirdly, the manual mode operational time determination on the basis of the use history is to determine a manual mode operational time based on the history that a user has inputted a command for entering a manual mode. For instance, after the user has inputted a user command to enable an output of the air conditioner (target device) to be set to $5^{th}$ step of total 5 steps, if the step is switched to $2^{nd}$ step of the total 5 steps after a prescribed duration or an output is turned off instead, a manual mode operational time for the air conditioner is determined based on the prescribed duration. In particular, considering the user's previous use patterns/habits, if an estimated timing point of releasing a manual mode or lowering the step comes, the manual mode is automatically switched to the power saving mode without the user's separate command or approval.

Finally, the manual mode operational time determination on the basis of the external command allows a manual mode operational time to be determined based on a command inputted from an outside source such as an external power service provider and the like. For instance, if a power used amount has rapidly increased to bring about a chance of an emergency of power failure, the power service provider can transmit an external command for announcing the emergency to a specific smart device or a specific smart server. In this case, by determining a type of the external command, an extent of the external command and the like, the manual mode operational time can be set short or reduced to zero.

Thus, as discussed above the manual mode operational time can be determined based on at least one of 1) user command, 2) external environment, 3) use history, and/or 4) external command. For instance, the manual mode operational time can be determined in combination of at least two of the four factors.

As mentioned in the foregoing description, when a user command corresponds to a time-unlimited command, it may be more effective to apply a manual mode operational time. If a user command is a time-limited command, a manual mode operational time can be determined based on the specified time limit. On the contrary, if a user command is a time-unlimited command, there is no specified time limit. Therefore, power loss can become considerable if the manual mode is maintained until the user releases the manual mode. For instance, when the user falls asleep or goes out while turning on the air conditioner (target device) or electricity rates go high after the activation of the air conditioner, if the manual mode is maintained, the user has to pay excessively for operating the air conditioner in the manual mode, which may not desirable. Therefore, an estimated timing point that a user may release the manual mode or lower the strength in the manual mode with attention paid by the user or a time taken to the estimated timing point is calculated, as the manual mode operational time for the target device. And then, the power saving mode is automatically entered from the manual mode at the corresponding timing point (upon the expiration of the manual mode operational time).

After the manual mode operational time determined by the determining unit 4670 has expired, the power saving mode switching unit 4660 stops the activation of the manual control unit 4640 and then activates the power saving control unit 4630 to automatically switch the target device from the manual mode to the power saving mode [S4750].

In the following description, an example of implementing features of a smart device according to a seventh embodiment of the present invention in a smart server is discussed.

Figure 48:
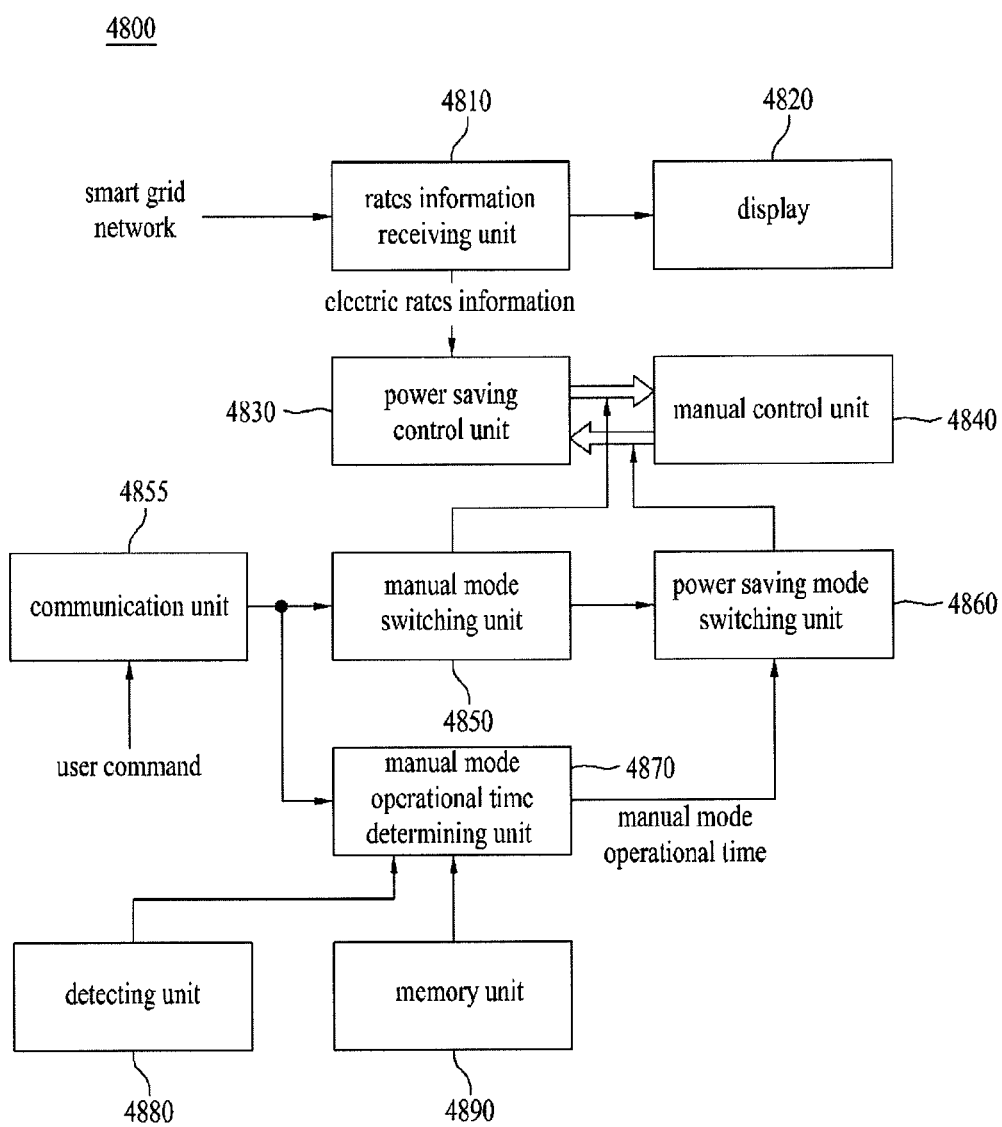
FIG. 48 is a diagram of configuration for a smart server according to a seventh embodiment of the present invention.
Figure 49:
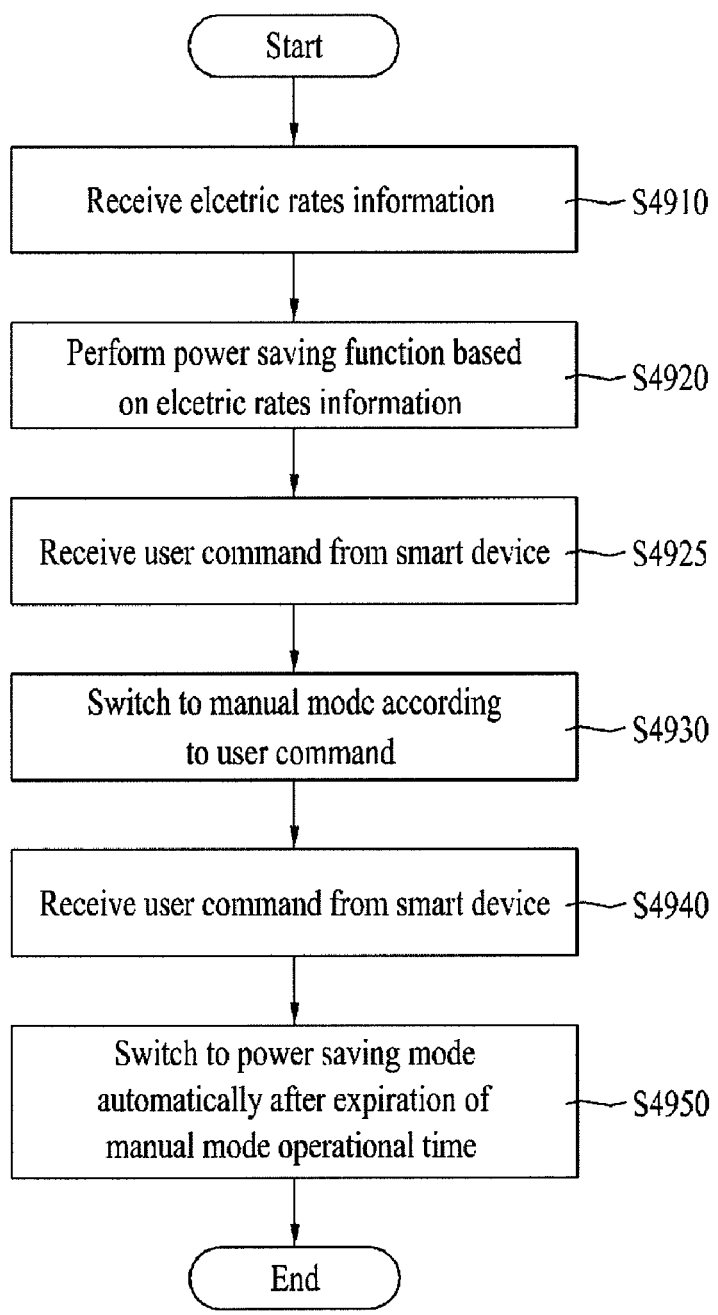
FIG. 49 is a flowchart of a method of controlling a power of a smart device according to a seventh embodiment of the present invention.

FIG. 48 is a diagram of configuration for a smart server according to a seventh embodiment of the present invention, and FIG. 49 is a flowchart of a method of controlling a power of a smart device according to a seventh embodiment of the present invention. All components of the smart server are operatively coupled and configured.

Referring to FIG. 48 and FIG. 49, a smart server 4800 is connected to a smart grid network and is also connected to at least one smart device (not shown in the drawing) through wired/wireless communication network. The smart server 4800 includes a rates information receiving unit 4810 for receiving power information, a display 4820, a power saving control unit 4830, a manual control unit 4840, a communication unit 4855, a manual mode switching unit 4850, a power saving mode switching unit 4860, a manual mode operational time determining unit 4870, a detecting unit 4880, a memory unit 4890, etc. Some components of the smart server 4800 can perform the same functions of the components having the same names described with reference to FIG. 46, of which details are omitted from the following description. Some steps S4910 to S4950 performed by the smart server 4800 can perform the same functions of the steps having the same names described with reference to FIG. 47, of which details are omitted from the following description. For instance, the operation by the smart server 4800 is the same as or similar to that of the smart device of FIG. 46, but the smart server 4800 receives the user commands from the smart device (e.g., see steps S4925 and S4940).

The communication unit 4855 receives a user command from a smart device [S4925] via at least one of an Internet protocol network, Zigbee and Bluetooth, etc., by which the present invention is non-limited. In case of applying Zigbee, the corresponding steps can be performed in the same manner as the formerly described steps. Meanwhile, although the communication unit 4855 is able to receive the user command via the smart device such as the smart device of FIG. 46 or a mobile terminal, laptop, tablet, appliance/device (target device), etc., if the smart device is remote-controllable, it can receive a user command from an external device. In this case, the communication unit is able to receive the user command from the external device via a mobile communication data network (e.g., W-CDMA: wideband code division multiple access) and/or the Internet protocol network.

Meanwhile, as mentioned in the foregoing description, the manual mode operational time determining unit 4870 is able to determine a manual mode operational time based on 1) user command, 2) external environment, and 3) use history. Moreover, the determination can be made by further referring to a type of the smart device. This is explained with reference to examples as follows.

First of all, when a type of a smart device is a refrigerator, if the device is determined as having a small variation in the amount of power previously used by the refrigerator, a user command can have more integrity by setting the manual mode operational time to be relatively long. On the contrary, when the variation in the amount of power used by the refrigerator is considerable like an air conditioner, the manual mode and the power saving mode considerably differ from each other with regards to electric rates. Hence, by setting the manual mode operational time for the refrigerator to be relatively short, the smart server is able to advance a timing point of entering the auto power control mode. Meanwhile, when a time limit command is mostly included in a user command for the smart device such a microwave range and a washer, if it is less probable that the electric rates for such target devices are going to vary within the specified time limit, the manual mode operational time for such devices can be set to be relatively long. Thus, unless a user inputs an excessive command by mistake, the smart server is able to set the user command to be performed with integrity.

The smart device and server including the configurations shown in FIG. 46 and FIG. 48 can implement any of the previous or other embodiments as well as the sixth embodiment and the seventh embodiment. Further, one or more features, operations, and units in one embodiment can be applied to any other embodiment.

Meanwhile, although some of the accompanying drawings describe the methods of the present invention, they are applicable to product inventions. And, the product invention and the method invention described in this disclosure can be construed as mutually supplementary. Moreover, steps of various flowcharts disclosed in this disclosure are selectively combined with each other in part to implement further embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A smart device, which is connected to a smart grid network to perform a power saving function, the smart device comprising:
   a power information receiving unit configured to receive power information through the smart grid network;
   a power saving control unit configured to perform the power saving function for at least one apparatus based on the power information in a power saving mode, the power saving mode being a mode in which the at least one apparatus is automatically controlled to save power;
   at least one mode switching unit configured to switch from the power saving mode to a manual mode according to a user command, the manual mode being a mode in which the at least one apparatus is controlled according to a user input;
   a manual mode operational time determining unit configured to determine a manual mode operational time for operating the at least one apparatus in the manual mode; and
   a detecting unit configured to receive external environment information, the external environment information including at least one of an external temperature and an external humidity,
   wherein the at least one mode switching unit is further configured to switch from the manual mode back to the power saving mode, automatically, when the manual mode operational time expires, and
   wherein the manual mode operational time determining unit determines the manual mode operational time based on the external environment information.

2. The smart device of claim 1, wherein the manual mode operational time determining unit determines the manual mode operational time based on a relation between a target status corresponding to the user command and a reference status of the smart device.

3. The smart device of claim 1, wherein the smart device is included in the at least one apparatus.

4. The smart device of claim 1, further comprising:
   a storage unit configured to store use history information of the smart device,
   wherein the manual mode operational time determining unit determines the manual mode operational time based on the use history information.

5. The smart device of claim 1, further comprising:
   a display configured to display the power information in real time.

6. A smart server, which is connected to at least one smart device via at least one wired/wireless communication network to perform a power saving function, the smart server comprising:
   a power saving control unit configured to perform the power saving function on the at least one smart device in a power saving mode, based on power information;
   at least one mode switching unit configured to switch the power saving mode to a manual power mode according to a user command received via the at least one smart device;
   a manual mode operational time determining unit configured to determine a manual mode operational time for operating the at least one smart device in the manual power mode since the at least one smart device is switched to be in the manual power mode;
   a detecting unit configured to receive external environment information of the smart device, the external environment information including at least one of external temperature information and external humidity information; and
   a storage unit configured to store use history information of the at least one smart device,
   wherein the at least one mode switching unit is further configured to switch from the manual power mode back to the power saving mode when the manual mode operational time expires, and
   wherein the manual mode operational time determining unit determines the manual mode operational time based on at least one of the following: a type of the at least one smart device, a relation between a target status corresponding to the user command and a reference status of the at least one smart device, the external environment information, and the use history information.

7. The smart server of claim 6, wherein the power information includes electric rate information, and the smart server further includes a power information receiving unit configured to receives the power information including the electric rate information from a smart grid network via at least one of an internet protocol network and a power line communication (PLC).

8. The smart server of claim 6, further comprising:
a communication unit configured to receive the user command from the at least one smart device through at least one of an internet protocol network, Zigbee, and Bluetooth.

9. A method for performing a power saving function using a smart device, which is connected to a smart grid network, the method comprising:
receiving, by the smart device, power information through the smart grid network;
performing, by the smart device, the power saving function for at least one apparatus based on the power information in a power saving mode, the power saving mode being a mode in which the at least one apparatus is automatically controlled to save power;
switching, by the smart device, from the power saving mode to a manual mode according to a user command, the manual mode being a mode in which the at least one apparatus is controlled according to a user input;
determining, by the smart device, a manual mode operational time for operating the at least one apparatus in the manual mode;
switching, by the smart device, from the manual mode back to the power saving mode, automatically, when the manual mode operational time expires; and
receiving, by the smart device, external environment information, the external environment information including at least one of an external temperature and an external humidity,
wherein the determining step determines the manual mode operational time based on the external environment information.

10. The method of claim 9, wherein the determining step determines the manual mode operational time based on a relation between a target status corresponding to the user command and a reference status of the smart device.

11. The method of claim 9, further comprising:
storing use history information of the smart device,
wherein the determining step determines the manual mode operational time based on the use history information.

12. A method for performing a power saving function using a smart server, which is connected to at least one smart device via at least one wired/wireless communication network, the method comprising:
performing, under control of the smart server and based on power information, the power saving function on the at least one smart device in a power saving mode;
switching, by the smart server, the power saving mode to a manual power mode according to a user command received via the at least one smart device;
determining, by the smart server, a manual mode operational time for operating the at least one smart device in the manual power mode since the mode is switched to the manual power mode;
switching, by the smart server, from the manual power mode back to the power saving mode when the manual mode operational time expires;
receiving, by the smart server, external environment information, the external environment information including at least one of external temperature information and external humidity information; and
storing use history information of the at least one smart device,
wherein the determining step determines the manual mode operational time based on at least one of the following: a type of the at least one smart device, a relation between a target status corresponding to the user command and a reference status of the at least one smart device, the external environment information, and the use history information.

13. The method of claim 12, further comprising:
receiving, by the smart server, the user command from the at least one smart device through at least one of an internet protocol network, Zigbee, and Bluetooth.

\* \* \* \* \*